(12) United States Patent
Zhang et al.

(10) Patent No.: US 11,028,334 B2
(45) Date of Patent: Jun. 8, 2021

(54) GRADIENT COPOLYMER, ITS PRODUCTION AND APPLICATION THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Yao Zhang, Beijing (CN); Qinghua Duan, Beijing (CN); Kecheng Wei, Beijing (CN); Yinong Liu, Beijing (CN); Hongwei Sun, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 25 days.

(21) Appl. No.: 16/313,869

(22) PCT Filed: Jun. 27, 2017

(86) PCT No.: PCT/CN2017/000409
§ 371 (c)(1),
(2) Date: Dec. 27, 2018

(87) PCT Pub. No.: WO2018/000804
PCT Pub. Date: Jan. 4, 2018

(65) Prior Publication Data
US 2019/0169521 A1     Jun. 6, 2019

(30) Foreign Application Priority Data
Jun. 28, 2016  (CN) .................. 201610490600.X

(51) Int. Cl.
*C10M 145/14*     (2006.01)
*C08F 220/14*     (2006.01)
(Continued)

(52) U.S. Cl.
CPC ......... *C10M 145/14* (2013.01); *C08F 220/14* (2013.01); *C08F 220/18* (2013.01);
(Continued)

(58) Field of Classification Search
CPC ............ C10M 145/14; C10M 169/041; C10M 2203/003; C10M 2209/084;
(Continued)

(56) References Cited

U.S. PATENT DOCUMENTS 3,869,396 A    3/1975  Van De Kraats et al.
6,140,431 A    10/2000 Kinker et al.
(Continued)

FOREIGN PATENT DOCUMENTS

CN     1034001 A     7/1989
CN     1193024 A     9/1998
(Continued)

OTHER PUBLICATIONS

Fan, Lichuang et al. "Preparation of viscosity index improver for 75W/90 Automotive Gear Oil", Petroleum Processing and Petrochemicals, vol. 42, No. 1, 2011 (English abstract on last page).
(Continued)

*Primary Examiner* — James C Goloboy
(74) *Attorney, Agent, or Firm* — Novick, Kim & Lee, PLLC; Allen Xue

(57) ABSTRACT

A gradient copolymer comprises or consists of n polymer components. The n polymer components each independently represents an addition polymer of a monomer of the formula (I), (Continued)

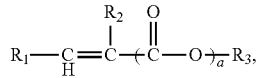

(I)

and/or a mixture thereof, or
the n polymer components each independently comprises or consists essential of one or more structural units represented by the formula (I-1),

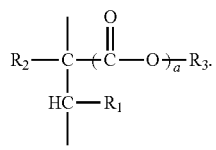

(I-1)

The symbol n represents an integer within the closed interval $[5, \infty]$. The average side chain carbon number of the i-th polymer component as determined according to the nuclear magnetic resonance method is expressed as $X_i$, with the symbol i representing an arbitrary integer from 1 to n, the relationship $X_1 < X_2 < \ldots < X_{n-1} < X_n$ holds.

20 Claims, 1 Drawing Sheet

(51) Int. Cl.
*C08F 220/18* (2006.01)
*C10M 169/04* (2006.01)

(52) U.S. Cl.
CPC ... *C10M 169/041* (2013.01); *C08F 220/1806* (2020.02); *C08F 220/1808* (2020.02); *C08F 220/1811* (2020.02); *C08F 220/1818* (2020.02); *C10M 2203/003* (2013.01); *C10M 2209/084* (2013.01)

(58) Field of Classification Search
CPC ............ C10N 2230/02; C10N 2030/02; C08F 220/18; C08F 220/1806; C08F 220/1808; C08F 220/1811; C08F 220/1818; C08F 220/14

See application file for complete search history.

(56) References Cited

U.S. PATENT DOCUMENTS

| | | | |
|---|---|---|---|
| 6,391,996 B1 * | 5/2002 | Scherer | C08F 220/18 526/317.1 |
| 6,403,745 B1 | 6/2002 | Scherer et al. | |
| 6,458,749 B2 | 10/2002 | Kinker et al. | |
| 7,981,848 B2 | 7/2011 | Placek et al. | |
| 2001/0056044 A1 | 12/2001 | Kinker et al. | |
| 2003/0166811 A1 | 9/2003 | Peiffer et al. | |
| 2006/0008431 A1 * | 1/2006 | Farcet | A61K 8/8152 424/60 |
| 2008/0146475 A1 | 6/2008 | Mueller et al. | |
| 2008/0194443 A1 | 8/2008 | Stohr et al. | |
| 2010/0144569 A1 | 6/2010 | Placek et al. | |
| 2018/0127575 A1 * | 5/2018 | Chichak | C08L 33/08 |

FOREIGN PATENT DOCUMENTS

| | | |
|---|---|---|
| CN | 1399649 A | 2/2003 |
| CN | 1474832 A | 2/2004 |
| CN | 102627716 A | 8/2012 |
| CN | 103965394 A | 8/2014 |
| CN | 105524209 A | 4/2016 |
| CN | 105585657 A | 5/2016 |
| CN | 106520261 A | 3/2017 |
| EA | 001149 B1 | 10/2000 |
| EP | 0710711 A1 | 5/1996 |
| EP | 1746146 A1 | 1/2007 |
| JP | H10306291 A | 11/1998 |
| JP | H10310758 A | 11/1998 |
| JP | 2017503898 A | 2/2017 |
| WO | 0140333 A1 | 6/2001 |

OTHER PUBLICATIONS

Zaremsky M.Yu et al, Gradient copolymers: production, structure, properties. High Molecular Compounds, Series A, 2009, vol. 51, No. 1, p. 137-160.
Russian federal institute of industrial property, Office Action of RU 22019102042, dated May 27, 2020.
Russian federal institute of industrial property, Search Report of RU 22019102042, dated May 27, 2020.

* cited by examiner

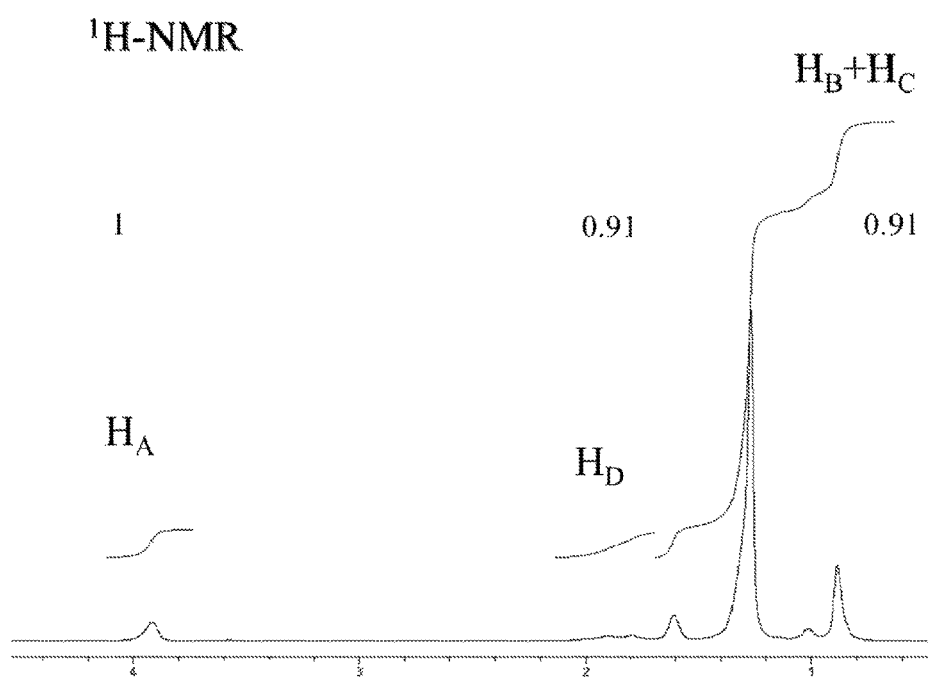

GRADIENT COPOLYMER, ITS PRODUCTION AND APPLICATION THEREOF

TECHNICAL FIELD

The present application relates to the field of polymers, and in particular to a gradient copolymer. The invention also relates to the production of the gradient copolymer and application thereof.

BACKGROUND ARTS

At present, the advancement of energy saving, environmental protection and engine technology has become the main driving force for the development of lubricating oil, which puts new demands on the viscosity, viscosity-temperature properties and low-temperature performance of the base oil. It is known that the base oil is an extremely complex mixture of alkanes of different structures, in which normal paraffins and isoparaffins having a lower degree of branching have good viscosity-temperature properties, but are easy to crystallize out at low temperatures and form a wax crystal network, thereby causing the fluidity of the base oil to gradually deteriorate as the temperature is lowered. In order to avoid this unfavorable situation, it is often necessary to add a pour point depressant while preparing a blend of the lubricating oil, so as to improve the low-temperature performance of the lubricating oil.

To this end, many kinds of pour point depressants have been developed in the prior arts.

CN106520261A discloses a pour point depressant composition for lubricating oil, which consists of a poly-α-olefin kind pour point depressant and a fumarate kind pour point depressant, wherein the mass ratio of the poly-α-olefin kind pour point depressant to the fumarate kind pour point depressant is 3:1-5.

With the development of lubricating oils, higher requirements have been placed on the performance of pour point depressants. Under such circumstances, new kinds of pour point depressants with better performance are stilled needed in the art.

SUMMARY OF THE INVENTION

After years of diligent research, the inventors have found a novel gradient copolymer, and noted that the gradient copolymer is, for example, particularly suitable for use as a pour point depressant, and thus arrived at the present application.

Particularly, the present application relates at least to the following aspects:

1. A gradient copolymer comprising or consisting of n polymer components, wherein the n polymer components each independently represents an addition polymer (particularly a radical addition polymer) of a monomer of the formula (I) and/or a mixture thereof, or the n polymer components each independently comprises or consists essentially of one or more structural units represented by the formula (I-1), and the symbol n represents an integer within the closed interval [5, ∞], preferably an integer within the closed interval [8, ∞], where the average number of carbon atoms in side chain of the i-th polymer component as determined according to the nuclear magnetic resonance method is expressed as $X_i$, with the symbol i representing an arbitrary integer from 1 to n, the following relationship holds, $$X_1 < X_2 < \ldots < X_{n-1} < X_n \quad \text{(II)},$$

and there is preferably a gradual increase from $X_1$ to $X_n$, and more preferably a linear increase from $X_1$ to $X_n$.

2. A method for producing a gradient copolymer, comprising the steps of adding at least two monomers to a polymerization system and conducting an addition copolymerization (particularly a radical addition copolymerization) of the at least two monomers, wherein the at least two monomers each independently represents a compound of the formula (I) and/or a mixture thereof, where the starting time of adding the at least two monomers to the polymerization system is expressed as $t_0$, and the termination time is expressed as $t_m$, the addition time of the at least two monomers is defined as t ($t=t_m-t_0$), and where the addition time is divided into m equal parts, the symbol m representing an integer within the closed interval [5, ∞], preferably an integer within the closed interval [8, ∞], the relative ratio between the at least two monomers added to the polymerization system at any moment of time $t_x$, the symbol x representing an arbitrary integer from 0 to m, during the addition of monomers is such that the average number of carbon atoms in side chain $X_x$ of a mixture composed of the at least two monomers at the relative ratio as determined according to the nuclear magnetic resonance method satisfies the following relationship, $$X_0 < X_1 < \ldots < X_{m-1} < X_m \quad \text{(V)}$$

and there is preferably a gradual increase from $X_0$ to $X_m$, and more preferably a linear increase from $X_0$ to $X_m$.

3. A method for producing a gradient copolymer, comprising the step of mixing p polymer components, wherein the p polymer components each independently represents an addition polymer (particularly a radical addition polymer) of a monomer of the formula (I) and/or a mixture thereof, or the p polymer components each independently comprises or consists essentially of one or more structural units represented by the formula (I-1), and the symbol p is an integer from 5 to 10000, preferably an integer from 8 to 5000, or an integer from 5 to 20, where the average number of carbon atoms in side chain of the i-th polymer component as determined according to the nuclear magnetic resonance method is expressed as $X_i$, with the symbol i representing an arbitrary integer from 1 to p, the following relationship holds, $$X_1 < X_2 < \ldots < X_{p-1} < X_p \quad \text{(VIII)}$$

and there is preferably a gradual increase from $X_1$ to $X_p$, and more preferably a linear increase from $X_1$ to $X_p$.

4. A method for controlling copolymerization, wherein the copolymerization is an addition copolymerization (particularly a radical addition copolymerization) occurred in a polymerization system to which at least two monomers are added, wherein the at least two monomers each independently represents a compound of the formula (I) and/or a mixture thereof, where the starting time of adding the at least two monomers to the polymerization system is expressed as to, and the termination time is expressed as $t_m$, the addition time of the at least two monomers is defined as t ($t=t_m-t_0$), and where the addition time is divided into m equal parts, the symbol m representing an integer within the closed interval [5, ∞], preferably an integer within the closed interval [8, ∞], the control method comprises adjusting the relative ratio between the at least two monomers added to the polymerization system at any moment of time $t_x$, the symbol x representing an arbitrary integer from 0 to m, during the addition of monomers, so that the average number of carbon atoms in side chain $X_x$ of a mixture composed of the at least two monomers at the relative ratio as determined according to the nuclear magnetic resonance method satisfies the following relationship, $$X_0 < X_1 < \ldots < X_{m-1} < X_m \quad (V)$$

and there is preferably a gradual increase from $X_0$ to $X_m$, and more preferably a linear increase from $X_0$ to $X_m$.

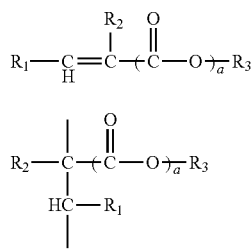

According to the aspect of any one of the above-described items, in the formula (I) or formula (I-1),
the group $R_1$ represents H or

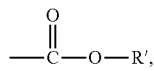

preferably H,
the group $R_2$ represents H or a $C_{1-4}$ linear or branched alkyl group, preferably H or methyl,
the symbol a represents 0 or 1, preferably 1,
the group R' represents H or a group $R_3$, preferably the group $R_3$,
the group $R_3$ represents a $C_1$-$C_{30}$ linear or branched alkyl group, preferably a $C_6$-$C_{24}$ linear or branched alkyl group, more preferably a $C_6$-$C_{20}$ linear alkyl group.
In other aspects, the present application also relates to various applications of the gradient copolymer.

BRIEF DESCRIPTION OF THE DRAWINGS

FIG. 1 is a NMR spectrum of a methacrylate polymer according to an embodiment of the present application.

TECHNICAL EFFECT

In an embodiment, the gradient copolymer according to the present application may exhibit an excellent pour point depressing effect for lubricating oils.
In an embodiment, the gradient copolymer according to the present application may exhibit a broad adaptability to lubricating base oils when used as a pour point depressant.
In an embodiment, the gradient copolymer according to the present application may provide two or more of the above-described technical effects simultaneously.

DETAILED DESCRIPTION OF THE INVENTION

Particular embodiments of the present application are described in detail below, but it should be noted that the scope of the present invention is not limited by the particular embodiments, but is defined by the appended claims.

All publications, patent applications, patents, and other references mentioned herein are hereby incorporated by reference.

Unless defined otherwise, all technical and scientific terms used herein have the same meaning as the common understanding of those skilled in the art. In case of conflict, the definition provided herein shall prevail.

When a subject, such as a material, substance, method, step, device, component, or the like, is described herein using the wording "commonly known to those skilled in the art", "prior art" or the like, the subject is intended to cover not only those conventionally used in the art before the filing of the present application, but also those not conventionally used but will become commonly recognized in the art to be suitable for similar applications.

In the context of the present application, the term "(meth) acrylic acid" refers to acrylic acid or methacrylic acid.

In the context of the present application, the expressions "at least two", "two or more" or the like, or the expression "a plurality of" used alone or the like, unless otherwise specified, generally means 2 or above, such as from 2 to 15, or from 3 to 10, such as from 5 to 8.

In the context of the present application, the number average molecular weight Mn and the molecular weight distribution Mw/Mn are determined by gel permeation chromatography (GPC), unless otherwise specified. Here, the gel permeation chromatography (GPC) is conducted under the following conditions: the instrument is a Model 1515 gel permeation chromatograph manufactured by Waters, USA; the detector is a Waters 2414 Refractive Index Detector; and the solvent used for the preparation of the standard is chromatographically pure tetrahydrofuran from Acros; the column is supplied by Waters, and is composed of three silica gel columns having different pore sizes that are connected in series, of which the specifications are (1) Waters Styragel® HR 0.5 THF, having a relative molecular weight measurement range of 1-1000 (7.8×300 mm), (2) Waters Styragel® HR 1 THF, having a relative molecular weight measurement range of 100-5000 (7.8×300 mm), and (3) Waters Styragel® HR 3 THF, having a relative molecular weight measurement range of 5000-600,000 (7.8×300 mm); the mobile phase is tetrahydrofuran, the mobile phase flow rate is 1.0 mL/min, the column temperature is 35° C., the detector temperature is 35° C., the injection volume is 200 µL, the sample concentration is 0.05 mmol/L, and the polymer standard sample is polybutyl methacrylate.

Finally, all percentages, parts, ratios, and the like mentioned herein are expressed on weight basis, unless otherwise indicated or it does not meet the conventional knowledge of those skilled in the art.

In the context of the present application, any two or more aspects described herein may be arbitrarily combined, and the resulted combination constitutes a part of the original description of the specification, and also falls within the protection scope of the present invention, and thus is not a new technical solution.

According to an aspect of the present application, a gradient copolymer is described. Here, the gradient copolymer may comprise or consist of n polymer components, preferably consist of the n polymer components. From this perspective, the gradient copolymer is actually an intermolecular gradient copolymer comprising or presenting as a mixture of the n polymer components.

According to an aspect of the present application, the n polymer components each independently represents an addition polymer, particularly a radical addition polymer, of a monomer of the formula (I) (hereinafter referred to as polymer A). Here, the polymer A may be a homopolymer of a single monomer of the formula (I), or a copolymer of two or more monomers of the formula (I). Examples of the copolymer include random copolymers, block copolymers, alternating copolymers, and the like. Moreover, a mixture of two or more polymers A may also be used as the polymer component. In view of this, one or more of the n polymer components may also represent a mixture of two or more polymers A.

According to this aspect of the present application, the polymer A or the n polymer components each independently comprises one or more structural units represented by the formula (I-1) (hereinafter sometimes referred to simply as "specific structural unit"), or consists essentially of one or more of the specific structural units. It is apparent that the structural unit represented by the formula (I-1) is derived from the monomer of the formula (I). Here, the term "essentially" means 85% or more, preferably 90% or more, and more preferably 95% or more, by mole relative to the total amount. The remainder of those polymer structures may be other structural unit(s) than the specific structural units or end group(s), but is generally an end group such as, for example, an initiator residue or the like.

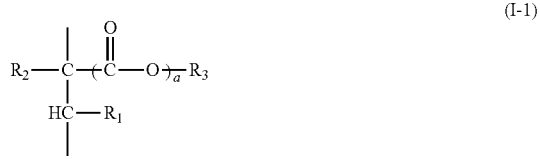

(I-1)

According to an aspect of the present application, the number average molecular weights Mn of the n polymer components are each independently from 10,000 to 1,000,000, preferably from 10,000 to 500,000, more preferably from 10,000 to 100,000.

According to an aspect of the present application, the molecular weight distributions Mw/Mn of the n polymer components are each independently from 1.8 to 3.5, preferably from 1.9 to 3.3.

According to an aspect of the present application, the gradient copolymer or the polymer A has a number average molecular weight Mn ranging from 10,000 to 1,000,000, preferably from 10,000 to 500,000, more preferably from 10,000 to 100,000.

According to an aspect of the present application, the gradient copolymer or the polymer A has a molecular weight distribution Mw/Mn ranging from 1.8 to 3.5, preferably from 1.9 to 3.3.

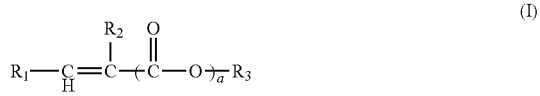

(I)

According to an aspect of the present application, in the formula (I) or formula (I-1), the group $R_1$ represents H or

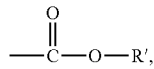

preferably H. Here, the group R' represents H or a group $R_3$, preferably the group $R_3$.

According to an aspect of the present application, in the formula (I) or formula (I-1), the group $R_2$ represents H or $C_{1-4}$ linear or branched alkyl, preferably H or methyl.

According to an aspect of the present application, in the formula (I) or formula (I-1), the symbol a represents 0 or 1, preferably 1.

According to an aspect of the present application, in the formula (I) or formula (I-1), the group $R_3$ represents a $C_1$-$C_{30}$ linear or branched alkyl group, preferably a $C_6$-$C_{24}$ linear or branched alkyl group, more preferably a $C_6$-$C_{20}$ linear alkyl group or a $C_8$-$C_{24}$ linear alkyl group.

According to an aspect of the present application, it is preferred that for one or more of the polymer A or the n polymer components, the proportion (by mole) of the specific structural unit, in which the group $R_3$ represents a $C_{10}$-$C_{18}$ linear or branched alkyl group, relative to the total amount of the structural units constituting those polymers is generally from 40% to 95%, preferably from 55% to 95%.

According to an aspect of the present application, as the monomer of the formula (I), for example, a mono-$C_1$-$C_{30}$ linear or branched alkyl fumarate, a di-$C_1$-$C_{30}$ linear or branched alkyl fumarate, a $C_3$-$C_{30}$ linear or branched α-olefin, and a $C_1$-$C_{30}$ linear or branched alkyl (meth)acrylate may be mentioned. Particularly, for example, a mono-$C_8$-$C_{24}$ linear or branched alkyl fumarate, a di-$C_8$-$C_{24}$ linear or branched alkyl fumarate, a $C_6$-$C_{20}$ linear or branched α-olefin, and a $C_6$-$C_{20}$ linear or branched alkyl (meth)acrylate may be mentioned. More particularly, for example, a mono-$C_8$-$C_{24}$ linear alkyl fumarate, a di-$C_8$-$C_{24}$ linear alkyl fumarate, a $C_6$-$C_{20}$ linear α-olefin, and a $C_6$-$C_{20}$ linear alkyl (meth)acrylate may be mentioned. Those monomers may be used alone or in a combination of two or more thereof at any ratio.

According to an aspect of the present application, as the mono-$C_8$-$C_{24}$ linear or branched alkyl fumarate, for example, a mono-$C_8$ linear alkyl fumarate, a mono-$C_{10}$ linear alkyl fumarate, a mono-$C_{12}$ linear alkyl fumarate, a mono-$C_{14}$ linear alkyl fumarate, a mono-$C_{16}$ linear alkyl fumarate, a mono-$C_{18}$ linear alkyl fumarate, a mono-$C_{20}$ linear alkyl fumarate, a mono-$C_{22}$ linear alkyl fumarate, and a mono-$C_{24}$ linear alkyl fumarate may be mentioned. Those mono-$C_8$-$C_{24}$ linear or branched alkyl fumarates may be used alone or in a combination of two or more thereof at any ratio.

According to an aspect of the present application, as the di-$C_8$-$C_{24}$ linear or branched alkyl fumarate, for example, a di-$C_8$ linear alkyl fumarate, a di-$C_{10}$ linear alkyl fumarate, a di-$C_{12}$ linear alkyl fumarate, a di-$C_{14}$ linear alkyl fumarate, a di-$C_{16}$ linear alkyl fumarate, a di-$C_{18}$ linear alkyl fumarate, a di-$C_{20}$ linear alkyl fumarate, a di-$C_{22}$ linear alkyl fumarate, and a di-$C_{24}$ linear alkyl fumarate may be mentioned. Those di-$C_8$-$C_{24}$ linear or branched alkyl fumarates may be used alone or in a combination of two or more thereof at any ratio.

According to an aspect of the present application, as the $C_6$-$C_{20}$ linear or branched α-olefin, for example, 1-hexene, 1-octene, 1-decene, 1-dodecene, 1-tetradecene, 1-hexadecene, 1-octadecene and 1-eicosene may be mentioned. Those $C_6$-$C_{20}$ linear or branched α-olefins may be used alone or in a combination of two or more thereof at any ratio.

According to an aspect of the present application, as the $C_6$-$C_{20}$ linear or branched alkyl (meth)acrylate, for example, a $C_6$ linear alkyl (meth)acrylate, a $C_8$ linear alkyl (meth) acrylate, a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be mentioned. Those $C_6$-$C_{20}$ linear or branched alkyl (meth)acrylates may be used alone or in a combination of two or more thereof at any ratio.

According to an aspect of the present application, as the $C_6$-$C_{20}$ linear or branched (meth)acrylate, for example, a combination of two or more of a $C_6$ linear alkyl (meth)acrylate, a $C_8$ linear alkyl (meth)acrylate, a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, and a $C_{18}$ linear alkyl (meth)acrylate may be used, or a combination of two or more of a $C_8$ linear alkyl (meth)acrylate, a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be used, or a combination of two or more of a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be used, preferably a combination of two or more of a $C_{12}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be used, or a combination of two or more of a $C_{10}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be used, or a combination of two or more of a $C_8$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be used.

According to an aspect of the present application, where the average number of carbon atoms in side chain as determined according to the nuclear magnetic resonance method (hereinafter sometimes referred to simply as the average side chain carbon number) of the i-th polymer component is expressed as $X_i$, with the symbol i representing an arbitrary integer from 1 to n, the following relationship is established. It is known from the following relationship that the n polymer components are different in structure and/or composition from each other, and the difference manifests at least as the different average side chain carbon numbers.

$$X_1 < X_2 < \ldots < X_{n-1} < X_n \quad (II)$$

In the context of the present application, the term "side chain" refers specifically to the group $R_3$ in the formula (I) or formula (I-1).

In the context of the present application, the expression "average number of carbon atoms in side chain as determined according to the nuclear magnetic resonance method" or "average side chain carbon number" refers to the average number of carbon atoms in the group $R_3$ of the target material measured by the nuclear magnetic resonance analysis described herein below.

According to an aspect of the present application, the target material may comprise a plurality of structural units represented by the formula (I-1) (or monomers of the formula (I)) having different groups $R_3$ (particularly, with different number of alkyl carbon atoms), and the relative ratio of those structural units (or monomers) may also be different for different target materials. Therefore, in general, the number of carbon atoms of the group $R_3$ contained in the target material is more properly to be described by an average value. In view of this, for example, the average side chain carbon number X can be used to reflect not only the number of kinds of structural units represented by the formula (I-1) (or the monomers of the formula (I)) in the target material, but also the relative ratio between those different kinds of structural units (or monomers).

Nuclear Magnetic Resonance Analysis

Instrument: INOVA 500 MHz NMR spectrometer produced by Varian Company, USA, using a solid double resonance probe (5 mm).

Conditions: room temperature, scanning times nt=1000, chemical displacement calibration δ tetramethyl silane=0, decoupling mode dm=nny (anti-gated decoupling), heavy water lock field.

Steps: the sample was subjected to $^1$H-NMR characterization, and the average side chain carbon number X of the sample was calculated by analyzing the corresponding nuclear magnetic resonance spectrum. A detailed description of the analysis process and calculation method can be found in the corresponding part described in the working examples of the present application.

According to an aspect of the present application, while conducting the nuclear magnetic resonance analysis, the target material may be a single material, including a pure material or a homogeneous mixture, such as a polymer component, a homogeneous mixture of a plurality of polymer components, a monomer, a homogeneous mixture of a plurality of monomers, a gradient copolymer or a homogeneous mixture of a plurality of gradient copolymers. Under such circumstances, the target material can be directly used as the sample to be characterized and analyzed. Alternatively, the target material may be a plurality of separate materials, such as the n polymer components as described above that are present in separate states from each other and are not premixed together to form a single material, or at least two monomers as will be described hereinbelow that are added to the polymerization system at a certain moment of time during the addition of monomers, when they are probably present in separate states from each other (for example, by adding to the polymerization system separately) and are not premixed together to form a single material. Accordingly, where the target material is a plurality of separate materials, the sample required for the nuclear magnetic resonance analysis can be prepared in accordance with the sample preparation step as describe below before conducting the nuclear magnetic resonance analysis.

Sample preparation step: mixing the plurality of separate materials at a predetermined ratio until uniform to produce a mixture, and then using the mixture as a sample.

According to an aspect of the present application, in the sample preparation step, the predetermined ratio refers to the relative ratio of the plurality of separate materials, when they are assumed to be present in a mixed state with each other as components of a mixture (i.e. a hypothetical mixture). By way of example, for the n polymer components, the predetermined ratio refers to the relative ratio of those polymer components in a gradient copolymer comprising or consisting of those polymer components; or, for the at least two monomers, the predetermined ratio refers to the relative ratio between the at least two monomers added to the polymerization system at the moment of time during the addition of monomers.

According to an aspect of the present application, the gradient copolymer has an average side chain carbon number X of generally from 5 to 20, preferably from 11.5 to 17, preferably from 11.5 to 16.2, more preferably from 12.2 to 15.7, more preferably from 12.2 to 15.5.

According to an aspect of the present application, the average side chain carbon number X of the n polymer components is generally from 5 to 20, preferably from 11.5 to 17, preferably from 11.5 to 16.2, more preferably from 12.2 to 15.7, more preferably From 12.2 to 15.5.

According to an aspect of the present application, the symbol n represents an integer within the closed interval [5, ∞], preferably an integer within the closed interval [8, ∞]. Here, the symbol n represents an integer, of which the lower limit may be 5 or 8, or may be 10 or 20. The upper limit of the integer represented by the symbol n may be ∞, or may be 20000, 10000, 5000, 1000, 500, 200, 100 or 50.

According to an aspect of the present application, the greater the value of the integer represented by the symbol n, the more the kind of polymer components comprised in the gradient copolymer. For ease of measurement, the state of the gradient copolymer comprising the n polymer components can be confirmed and identified by gel permeation chromatography resolution (see the corresponding description hereinbelow). Under such circumstances, the number n of the polymer components corresponds to the number n of the effluents or fractions obtained by the gel permeation chromatography resolution. Accordingly, the larger the value of the integer represented by the symbol n, the more the kind of the polymer components comprised in the gradient copolymer, and also the greater the number of effluents or fractions obtained by the gel permeation chromatography resolution. When the value of the integer represented by the symbol n is sufficiently large, for example, when its upper limit value reaches ∞, of course, this does not mean that the numerical value of the upper limit actually reaches ∞, but means that the difference between each other in structure and/or composition (especially the difference in the average side chain carbon number X) of the n polymer components has reached a continuous or steplessly smooth level of changing, which also means that the gel permeation chromatography resolution has achieved a continuous or steplessly smooth level of resolution of the effluents or fractions. For example, when n=∞, the change of the value of the average side chain carbon number from $X_1$ to $X_n$ no longer appears as a finite ascending series, but appears as a continuous increase, especially a stepless or smooth increase.

According to an aspect of the present application, as shown in the relationship (II), the value of the average side chain carbon number X exhibits an increase from $X_1$ to $X_n$, such as a gradual increase or a linear increase. The present application has no particular requirement on the incremental magnitude (also referred to as the step size) between any adjacent two Xs in the increasing series, as long as it is considered by those skilled in the art to be an effective increment. Moreover, the increase may be an increment in equal step sizes, or an increment in unequal step sizes, with no particular limitation in the present application. As the step size, it may be generally, for example, any value within a rang from 0.01 to 4.00, or any value within a rang from 0.05 to 1.5, but is not limited thereto.

According to an aspect of the present application, as said $X_1$, it denotes the starting point and the minimum value of the whole increasing series, which may be, for example, any value within a rang from 6.5 to 12.5, or any value within a rang from 7.8 to 12.0, but is not limited thereto. In addition, as said $X_n$, it denotes the end point and the maximum value of the whole increasing series, which may be, for example, any value within a rang from 13.8 to 19.5, or any value within a rang from 14.5 to 18.2, but is not limited thereto.

According to an aspect of the present application, where the weight percentage of the i-th polymer component relative to the total weight of the n polymer components (or the gradient copolymer) (hereinafter sometimes referred to simply as the component ratio) is expressed as $Y_i$, with the symbol i representing an arbitrary integer from 1 to n, the following relationship holds.

$$Y_1 < Y_2 < \ldots < Y_j > \ldots > Y_{n-1} > Y_n \quad (III)$$

According to an aspect of the present application, in the relationship (III), the symbol j represents an integer within the closed interval [(n+1)/4, 3(n+1)/4], preferably an integer within the closed interval [(n+1)/3, 2(n+1)/3], more preferably an integer within the closed interval [2(n+1)/5, 3(n+1)/5], and $Y_1+Y_2+ \ldots +Y_j+ \ldots +Y_{n-1}+Y_n=100\%$.

According to an aspect of the present application, as shown in the relationship (III), the value of the component ratio Y exhibits an increase from $Y_1$ to $Y_j$, such as a gradual increase or a linear increase. The present application has no particular requirement on the incremental magnitude (also referred to as the step size) between any two adjacent Ys in the increasing series, as long as it is considered by those skilled in the art to be an effective increment. Moreover, the increase may be an increment in equal step sizes, or an increment in unequal step sizes, with no particular limitation in the present application. As the step size, it may be generally, for example, any value within a rang from 0.05% to 20%, or any value within a rang from 0.1% to 5%, but is not limited thereto.

According to an aspect of the present application, as said $Y_1$, it denotes the starting point and the minimum value of the whole increasing series, which may be, for example, any value within a rang from 0.01% to 20%, or from 0.1% to 10%, but is not limited thereto. In addition, as said $Y_j$, it denotes the end point and the maximum value of the whole increasing series, which may be, for example, any value within a rang from 20% to 75%, or any value within a rang from 25% to 65%, but is not limited thereto.

According to an aspect of the present application, as shown in the relationship (III), the value of the component ratio Y exhibits a decrease from $Y_j$ to $Y_n$, such as a gradual decrease or a linear decrease. The present application has no particular requirement on the decremental magnitude (also referred to as the step size) between any two adjacent Ys in the decreasing series, as long as it is considered by those skilled in the art to be an effective decrement. Moreover, the decrease may be a decrement in equal step sizes or a decrement in unequal step sizes, with no particular limitation in the present application. As the step size, it may be generally, for example, any value within a rang from 0.05% to 20%, or any value within a rang from 0.1% to 5%, but is not limited thereto.

According to an aspect of the present application, as said $Y_j$, according to the description hereinabove, it denotes the starting point and the maximum value of the whole decreasing series, which may be, for example, any value within a rang from 20% to 75%, or any value within a rang from 25% to 65%, but is not limited thereto. Further, as said $Y_n$, it denotes the end point and the minimum value of the whole decreasing series, which may be, for example, any value within a rang from 0.01% to 20%, or any value within a rang from 0.1% to 10%, but is not limited thereto.

According to an aspect of the present application, the $Y_n$ may be the same as or different from the $Y_1$, with no particular limitation in the present application.

According to an aspect of the present application, as shown in the relationship (III), the value of the component ratio Y exhibits a distribution with low intermediate height on both sides from $Y_1$ to $Y_n$, which is very similar to a Gaussian distribution. Accordingly, according to an embodiment of the present application, in an ideal state, where the value of the component ratio Y is taken as the ordinate, and the value of the average side chain carbon number X is taken as the abscissa, the change of the relationship between these two parameters of the polymer component from the first one to the n-th one conforms to or substantially conforms to the Gaussian distribution, as shown, for example, in the equation (IV). Here, the expression "substantially conform" means that the relationship between the two parameters may be slightly deviated from the Gaussian distribution as shown in the equation (IV), with a deviation within the range acceptable to those skilled in the art.

$$Y_i = f(X_i) = \frac{1}{\sqrt{2\pi}\,\sigma} e^{-\frac{(X_i-\mu)^2}{2\sigma^2}} \quad (IV)$$

According to an aspect of the present application, in the equation (IV), the symbol t represents an arbitrary value within the open interval (12.5, 14.2), preferably an arbitrary value within the open interval (12.6, 13.8), and the symbol σ represents an arbitrary value within the open interval (0.5, 2). The symbol π represents the Pi, which can generally be 3.141592654 or 3.14, and the symbol e represents the natural constant and can generally be 2.718281828 or 2.72.

According to an aspect of the present application, the gradient copolymer can be prepared according to one or more of the following production methods. In the following, for the sake of simplicity, any information not specifically or detailedly provided when describing the production method, such as the type of reactor, the usage of various additives, the pretreatment of the feed, the separation of the reaction products, and the like, can be obtained by directly referring to the corresponding knowledge known in the art.

According to an aspect of the present application, the production method comprises the steps of adding at least two monomers to the polymerization system, and conducting an addition copolymerization of the at least two monomers. Hereinafter, such a production method is sometimes referred to as production method A.

According to an aspect of the present application, the expression "at least two monomers" may refer to at least two monomer compounds, at least two monomer mixtures, with each monomer mixture comprising two or more monomer compounds, or a combination thereof. It can thus be seen that one or more of the at least two monomers may sometimes be present as a monomer mixture. Under such circumstances, in the context of the present application, the term "monomer" covers, in its meaning, both monomer compound and monomer mixture, unless otherwise specified.

According to an aspect of the present application, at least two monomers, e.g. two monomers, are added to the polymerization system. For example, as an addition mode for the monomers, the two monomers may be generally added synchronously to the polymerization system, that is, the addition of the two monomers to the polymerization system is started at the same time and is also terminated at the same time. Moreover, for example, as a further addition mode for the monomers, the two monomers may be separately added to the polymerization system at a predetermined ratio, or may be mixed with each other at a predetermined ratio to form a monomer mixture, and then added to the polymerization system, with no particular limitation in the present application. Here, the addition is normally carried out continuously, but may also be carried out in stages or intermittently at predetermined time intervals depending on circumstances, in which continuous addition is preferred. Further, where there are more than two kinds, e.g. three or more kinds, of monomers, those monomers may be added to the polymerization system in a manner similar to the case of two monomers. In particular, where there are more than two kinds of monomers, for example monomer A, monomer B, and monomer C, the monomers can be added in a manner similar to the case of the two monomers; and in addition to this way of addition, a further possible way of addition is as follows: the addition of the monomer A and the monomer B to the polymerization system is stated at the same time, then, at a certain moment of time, the addition of the monomer B is terminated while the addition of the monomer C is started, and finally the addition of the monomer A and the monomer C is terminated at the same time. Of course, those three monomers may be added separately as three feeds; or may be mixed with each other as a monomer mixture and then added as one feed; or two of them may be mixed into a monomer mixture, and then added with the third monomer separately as two feeds, with no particular limitation in the present application. In addition, where there are more than three kinds of monomers, those monomers may be added to the polymerization system in a manner similar to the case of three monomers, or in various other manners of addition that may be conceived by those skilled in the art, with no particular limitation in the present application. For example, where there are four kinds of monomers, such as monomer A, monomer B, monomer C, and monomer D, a further possible manner of addition is as follows: the addition of the monomer A and the monomer B to the polymerization system is started at the same time, then, at a certain moment of time, the addition of the monomer A and the monomer B is terminated while the addition of the monomer C and the monomer D is started, and finally the addition of the monomer C and the monomer D is terminated at the same time.

According to an aspect of the present application, in order to facilitate the implementation of the addition copolymerization, the at least two monomers are sometimes added to the polymerization system in the form of a feed mixture. Here, as components of the feed mixture, normally one or more additives conventionally used for the addition copolymerization, such as a solvent, a diluent, an initiator, a molecular weight modifier, a polymerization catalyst, and the like, may be used as needed, in addition to the at least two monomers. Moreover, the types and amounts of the additives can be determined with reference to related requirements in the art, and there is no particular limitation in the present application.

According to an aspect of the present application, in the polymerization system, the at least two monomers undergo an addition copolymerization, particularly a radical addition copolymerization, by means of the carbon-carbon double bond to obtain a gradient copolymer. The gradient copolymer may comprise the gradient copolymer described in various aspects of the specification of the present application.

According to an aspect of the present application, the reaction temperature of the addition copolymerization is generally from 50° C. to 180° C., preferably from 55° C. to 165° C., more preferably from 60° C. to 150° C.

According to an aspect of the present application, the reaction time of the addition copolymerization is generally from 1 hour to 24 hours, preferably from 1.5 hours to 20 hours.

According to an aspect of the present application, the addition copolymerization may be carried out in any manner, such as by bulk polymerization, solution polymerization, emulsion polymerization, suspension polymerization, or the like, preferably by solution polymerization.

According to an aspect of the present application, in order to facilitate the improvement of the monomer conversion, the addition copolymerization may sometimes be continued for 0.5 to 2 hours after the termination of the addition of monomers. Alternatively, after supplementing the initiator, polymerization catalyst, diluent, or the like, as needed, the temperature of the polymerization system may be raised to 100-150° C., and then the reaction may be continued for another 0.5-5 hours. Those reaction modes are known to those skilled in the art.

According to an aspect of the present application, as the initiator, those conventionally used in the art, particularly radical polymerization initiators, may be used without particular limitation. Examples of the initiator include azo initiators, peroxide initiators, and redox initiators. Examples of the azo initiator include dimethyl azobisisobutyrate, azobisisobutyl hydrazine hydrochloride, azodicarbonamide, and azodiisopropylimidazolinium hydrochloride, azoisobutylcyanocarboxamide, azobiscyclohexylcarbonitrile, azobiscyanovaleric acid, azodiisopropylimidazoline, azobisisobutyronitrile, azobisisovaleronitrile and azobisisoheptanenitrile. Examples of the peroxide initiators include hydrogen peroxide, ammonium persulfate, sodium persulfate, potassium persulfate, lauroyl peroxide, t-butyl hydroperoxide, dicumyl peroxide, di-tert-butyl peroxide, benzoyl peroxide, t-butyl peroxybenzoate, t-butyl peroxypivalate, cyclohexanone peroxide, methyl ethyl ketone peroxide, diisopropyl peroxydicarbonate. Examples of the redox initiator include sulfate-sulfite, persulfate-thiourea, persulfate-organic salt, and ammonium persulfate-fatty amine. Those initiators may be used alone or in a combination of two or more thereof at any ratio. Further, there is no particular limitation to the amount of the initiator to be used in the present application, and those conventionally known in the art can be adopted. For example, as the total amount of the initiator used through the entire addition copolymerization, it may be generally from 0.01 to 2.5 parts by weight, preferably from 0.05 to 2 parts by weight, more preferably from 0.1 to 1.5 parts by weight, based on 100 parts by weight of the total amount of the monomers.

According to an aspect of the present application, as the diluent, those conventionally used in the art, particularly diluent oils, may be used without particular limitation. Examples of the diluent oil include diesel oil, kerosene, mineral spirits, aromatic hydrocarbon solvents, white oils, mineral base oils or synthetic oils, preferably white oils, mineral base oils or synthetic oils, preferably mineral base oils. The diluent oil may be commercially available diluent oils, such as a diluent oil available from Ssangyong Corporation under the designation 100N. The diluent oil may or may not be separated from the gradient copolymer after the completion of the addition copolymerization. Those diluent oils may be used alone or in a combination of two or more thereof at any ratio. Further, there is no particular limitation to the amount of the diluent oil to be used in the present application, and those conventionally known in the art can be adopted. For example, as the total amount of the diluent oil used through the entire addition copolymerization, it may be generally 10-150 parts by weight, preferably 50-100 parts by weight, more preferably 60-80 parts by weight, based on 100 parts by weight of the total amount of the monomers.

According to an aspect of the present application, as the molecular weight modifier, those conventionally used in the art can be used without particular limitation. Examples of the molecular weight modifier include dodecyl mercaptan or 2-mercaptoethanol. Those molecular weight modifiers may be used alone or in a combination of two or more thereof at any ratio. Further, there is no particular limitation to the amount of the molecular weight modifier to be used in the present application, and those conventionally known in the art can be adopted.

According to an aspect of the present application, as the polymerization catalyst, those conventionally used in the art can be used without particular limitation. Examples of the polymerization catalyst include radical polymerization catalysts, particularly Ziegler-Natta catalysts. Those polymerization catalysts may be used alone or in a combination of two or more thereof at any ratio. Further, there is no particular limitation to the amount of the polymerization catalyst to be used in the present application, and those conventionally known in the art can be adopted.

According to an aspect of the present application, the addition copolymerization is generally carried out in an inert atmosphere. Here, the term "inert atmosphere" refers to the atmosphere of an inactive gas which does not chemically react with the reactant and product. Examples of the inactive gas include nitrogen, inert gases, and the like. As a method for maintaining the inert atmosphere, for example, a method comprising continuously introducing the inert gas into the polymerization system may be mentioned.

According to an aspect of the present application, the at least two monomers each independently represents a compound of the formula (I). As mentioned hereinbefore, one or more of the at least two monomers may sometimes be present as a monomer mixture. In such a case, according to this aspect of the present application, the two or more monomer compounds contained in the monomer mixture each independently represents a compound of the formula (I).

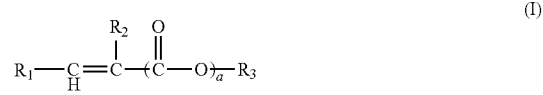

According to an aspect of the present application, in the formula (I), the group $R_1$ represents H or

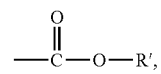

preferably H. Here, the group R' represents H or a group $R_3$, preferably the group $R_3$.

According to an aspect of the present application, in the formula (I), the group $R_2$ represents H or a $C_{1-4}$ linear or branched alkyl, preferably H or methyl.

According to an aspect of the present application, in the formula (I), the symbol a represents 0 or 1, preferably 1.

According to an aspect of the present application, in the formula (I), the group $R_3$ represents a $C_1$-$C_{30}$ linear or branched alkyl group, preferably a $C_6$-$C_{24}$ linear or branched alkyl group, more preferably a $C_6$-$C_{20}$ linear alkyl or a $C_8$-$C_{24}$ linear alkyl.

According to an aspect of the present application, it is preferred that the proportion (by mole) of the compound of the formula (I), in which the group $R_3$ represents a $C_{10}$-$C_{18}$ linear or branched alkyl group, relative to the total amount of the monomers (i.e. the total amount of the at least two monomers) is generally from 40% to 95%, preferably from 55% to 95%.

According to an aspect of the present application, as the compound of the formula (I), for example, a mono-$C_1$-$C_{30}$ linear or branched alkyl fumarate, a di-$C_1$-$C_{30}$ linear or branched alkyl fumarate, a $C_3$-$C_{30}$ linear or branched α-olefin, and a $C_1$-$C_{30}$ linear or branched alkyl (meth)acrylate may be mentioned. Particularly, for example, a mono-$C_8$-$C_{24}$ linear or branched alkyl fumarate, a di-$C_8$-$C_{24}$ linear or branched alkyl fumarate, a $C_6$-$C_{20}$ linear or branched α-olefin, and a $C_6$-$C_{20}$ linear or branched alkyl (meth)acrylate may be mentioned. More particularly, for example, a mono-$C_8$-$C_{24}$ linear alkyl fumarate, a di-$C_8$-$C_{24}$ linear alkyl fumarate, a $C_6$-$C_{20}$ linear α-olefin, and a $C_6$-$C_{20}$ linear alkyl (meth)acrylate may be mentioned. Those monomers may be used alone or in a combination of two or more thereof at any ratio.

According to an aspect of the present application, as the mono-$C_8$-$C_{24}$ linear or branched alkyl fumarate, for example, a mono-$C_8$ linear alkyl fumarate, a mono-$C_{10}$ linear alkyl fumarate, a mono-$C_{12}$ linear alkyl fumarate, a mono-$C_{14}$ linear alkyl fumarate, a mono-$C_{16}$ linear alkyl fumarate, a mono-$C_{18}$ linear alkyl fumarate, a mono-$C_{20}$ linear alkyl fumarate, a mono-$C_{22}$ linear alkyl fumarate, and a mono-$C_{24}$ linear alkyl fumarate may be mentioned. Those mono-$C_8$-$C_{24}$ linear or branched alkyl fumarates may be used alone or in a combination of two or more thereof at any ratio.

According to an aspect of the present application, as the di-$C_8$-$C_{24}$ linear or branched alkyl fumarate, for example, a di-$C_8$ linear alkyl fumarate, a di-$C_{10}$ linear alkyl fumarate, a di-$C_{12}$ linear alkyl fumarate, a di-$C_{14}$ linear alkyl fumarate, a di-$C_{16}$ linear alkyl fumarate, a di-$C_{18}$ linear alkyl fumarate, a di-$C_{20}$ linear alkyl fumarate, a di-$C_{22}$ linear alkyl fumarate, and a di-$C_{24}$ linear alkyl fumarate may be mentioned. Those di-$C_8$-$C_{24}$ linear or branched alkyl fumarates may be used alone or in a combination of two or more thereof at any ratio.

According to an aspect of the present application, as the $C_6$-$C_{20}$ linear or branched α-olefin, for example, 1-hexene, 1-octene, 1-decene, 1-dodecene, 1-tetradecene, 1-hexadecene, 1-octadecene and 1-eicosene may be mentioned. Those $C_6$-$C_{20}$ linear or branched α-olefins may be used alone or in a combination of two or more thereof at any ratio.

According to an aspect of the present application, as the $C_6$-$C_{20}$ linear or branched alkyl (meth)acrylate, for example, a $C_6$ linear alkyl (meth)acrylate, a $C_8$ linear alkyl (meth)acrylate, a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be mentioned. Those $C_6$-$C_{20}$ linear or branched alkyl (meth)acrylates may be used alone or in a combination of two or more thereof at any ratio.

According to an aspect of the present application, as the $C_6$-$C_{20}$ linear or branched (meth)acrylate, for example, a combination of two or more of a $C_6$ linear alkyl (meth)acrylate, a $C_8$ linear alkyl (meth)acrylate, a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, and a $C_{18}$ linear alkyl (meth)acrylate may be used, or a combination of two or more of a $C_8$ linear alkyl (meth)acrylate, a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be used, or a combination of two or more of a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be used, preferably a combination of two or more of a $C_{12}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be used, or a combination of two or more of a $C_{10}$ linear alkyl (meth)acrylate, a $C_{14}$ linear alkyl (meth)acrylate, a $C_{16}$ linear alkyl (meth) acrylate, a $C_{18}$ linear alkyl (meth)acrylate and a $C_{20}$ linear alkyl (meth)acrylate may be used, or a combination of two or more of a $C_8$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be used.

According to an aspect of the present application, the compound of the formula (I) can be obtained commercially or can be produced by various methods known in the art. Particularly, for example, the $C_6$-$C_{20}$ linear or branched alkyl (meth)acrylate can be obtained by an esterification reaction of (meth)acrylic acid with a $C_6$-$C_{20}$ linear or branched alkanol, or by a transesterification reaction of methyl (meth)acrylate with a $C_6$-$C_{20}$ linear or branched alkanol, with no particular limitation in the present application.

According to an aspect of the present application, where the starting time of adding the at least two monomers to the polymerization system is expressed as $t_0$, and the termination time is expressed as $t_m$, the addition time of the at least two monomers is defined as t ($t = t_m - t_0$). In order to increase the monomer conversion as much as possible, or depending on the addition mode of the at least two monomers, the addition time is normally shorter than the reaction time of the copolymerization. For example, the addition time is generally from 0.5 hours to 12 hours, preferably from 1 hour to 10 hours.

According to an aspect of the present application, where the addition time t is divided into m equal parts, the average side chain carbon number of the at least two monomers at any moment of time $t_x$ during the addition of monomers is expressed as $X_x$, with the symbol x representing an arbitrary integer from 0 to m, the following relationship is established. In other words, at any moment of time $t_x$ during the addition of monomers, the relative ratio between the at least two monomers added to the polymerization system is such that the average side chain carbon number $X_x$ as determined according to the nuclear magnetic resonance method of a (hypothetical) mixture composed of the at least two monomers at the relative ratio satisfies the following relationship.

$$X_0 < X_1 < \ldots < X_{m-1} < X_m \quad (V)$$

According to an aspect of the present application, as previously described herein, the average side chain carbon number $X_x$ of the at least two monomers refers to the average side chain carbon number of a (hypothetical) mixture composed of the at least two monomers at a predetermined ratio, in which the predetermined ratio refers to the relative ratio between the at least two monomers added to the polymerization system at any moment of time $t_x$ during the addition of monomers.

According to an aspect of the present application, there is no particular limitation to the relative ratio between the at least two monomers added to the polymerization system at the moment of time $t_x$ during the addition of monomers, and the relative ratio may be any value as long as it enables the average side chain carbon number $X_x$ of the hypothetical mixture to satisfy the relationship (V). As a simple example, it is assumed that the at least two monomers are two monomers, i.e. monomer A and monomer B, in which the monomer A has an average side chain carbon number greater than that of the monomer B. In order to satisfy the relationship (V), the addition amount of the monomer B may be maintained constant while gradually increasing the addition amount of the monomer A from the starting time $t_0$ to the termination time $t_m$ during the addition of the two monomers to the polymerization system; or the addition amount of the monomer A may be maintained constant while gradually reducing the addition amount of the monomer B, or the addition amounts of the two monomers may be changed simultaneously, as long as the addition amount of the monomer B is made relatively reduced as compared with the addition amount of the monomer A.

According to an aspect of the present application, the addition amounts of the monomer A and the monomer B can be adjusted by manual regulation or automatically by a program, so that a continuous change of the ratio between the addition amounts of the monomer A and the monomer B can be achieved, with the total addition amount being continuously changed. As a simple example, from the starting time $t_0$ the termination time $t_m$ of the polymerization reaction, the addition amount of the monomer B may be maintained constant, and the addition rate of the monomer A may be manually and steadily adjusted in an intermittent manner by setting m control points, so that the addition amount of the monomer B may be made relatively reduced as compared with the addition amount of the monomer A in an intermittent manner. It is also possible to set a control program that is easy for the practitioner to develop and handle, through which a continuous adjustment of the addition rate of the monomer A can be realized, thereby satisfying the relationship (V).

According to an aspect of the present application, the symbol m represents an integer within the closed interval [5, ∞], preferably an integer within the closed interval [8, ∞]. Here, the symbol m represents an integer, of which the lower limit may be 5 or 8, or may be 10 or 20. The upper limit of the integer represented by the symbol m may be 00, or may be 20000, 10000, 5000, 1000, 500, 200, 100 or 50.

According to an aspect of the present application, the greater the value of the integer represented by the symbol m, the more continuous the change between adjacent two moments of time of the addition, and also the more continuous the change in the average side chain carbon number between adjacent two moments of time of the addition. When the value of the integer represented by the symbol m is sufficiently large, for example, when its upper limit value reaches ∞, of course, this does not mean that the numerical value of the upper limit actually reaches ∞, but means that, with a continuous change of the addition time, the change of the average side chain carbon number has also reached a continuous or steplessly smooth level. For example, when m=∞, the change of the value of the average side chain carbon number from $X_0$ to $X_m$ no longer appears as a finite ascending series, but appears as a continuous increase, especially a stepless or smooth increase.

According to an aspect of the present application, as shown in the relationship (V), the value of the average side chain carbon number X exhibits an increase from $X_0$ to $X_m$, such as a gradual increase or a linear increase. The present application has no particular requirement on the incremental magnitude (also referred to as the step size) between any adjacent two Xs in the increasing series, as long as it is considered by those skilled in the art to be an effective increment. Moreover, the increase may be an increment in equal step sizes, or an increment in unequal step sizes, with no particular limitation in the present application. As the step size, it may be generally, for example, any value within a rang from 0.01 to 4.00, or any value within a rang from 0.05 to 1.5, but is not limited thereto.

According to an aspect of the present application, as said $X_0$, it represents the average side chain carbon number of the at least two monomers at the starting time $t_0$ of the addition of the at least two monomers to the polymerization system, and also denotes the starting point and the minimum value of the whole increasing series, which may be, for example, any value within a rang from 6.5 to 12.5, or any value within a rang from 7.8 to 12.0, but is not limited thereto. In addition, as said $X_n$, it represents the average side chain carbon number of the at least two monomers at the termination time $t_m$ of the addition of the at least two monomers to the polymerization system, and also denotes the end point and the maximum value of the whole increasing series, which may be, for example, any value within a rang from 13.8 to 19.5, or any value within a rang from 14.5 to 18.2, but is not limited thereto.

According to an aspect of the present application, where, at the termination time $t_m$ of the addition, a sum of the cumulative amounts of the at least two monomers added to the polymerization system through the addition time t is expressed as G, and a sum of the amounts of the at least two monomers added to the polymerization system at any moment of time $t_x$ during the addition of monomers is expressed as $G_x$, with the symbol x representing an arbitrary integer from 0 to m, the following relationship holds. Hereinafter, the ratio $G_x/G$ is sometimes simply referred to as an addition-amount ratio.

$$G_0/G < G_1/G < \ldots < G_j/G > \ldots > G_{m-1}/G > G_m/G \qquad (VI)$$

According to an aspect of the present application, in the relationship (VI), the symbol j represents an integer within the closed interval [m/4, 3m/4], preferably an integer within the closed interval [m/3, 2m/3], more preferably an integer within the closed interval [2m/5, 3m/5], and $G_0+G_1+\ldots+G_j+\ldots+G_{m-1}+G_m=G$.

According to an aspect of the present application, at any moment of time $t_x$ during the addition of monomers, the at least two monomers, expressed as q monomers, are added to the polymerization system. Here, the symbol q represents the number of monomer species involved in the production method A, and may be, for example, any integer from 2 to 100 or any integer from 2 to 20, particularly any integer from 2 to 5. Here, where the amount (absolute value) of each monomer added to the polymerization system at the moment of time $t_x$ during the addition of monomers is expressed as $g_s$, with the symbol s representing an arbitrary integer from 1 to q, the sum of the addition amounts is equal to the $G_x$, and the ratio between the addition amounts is the relative ratio between the at least two monomers added to the polymerization system at the moment of time $t_x$. As described hereinbefore, at any moment of time $t_x$ during the addition of monomers, the relative ratio is required to enable the average side chain carbon number $X_x$ of the hypothetical mixture to satisfy the relationship (V). This is a requirement on the relative value of the addition amounts of the at least two monomers. According to this aspect of the present application, there is no particular limitation to the absolute value of the addition amount of each of the at least two monomers, as long as the sum of the addition amounts reaches the $G_x$, and enables the $G_x$ or the $G_x/G$ to satisfy the relationship (VI). As a simple example, it is assumed that the at least two monomers are two monomers, i.e. monomer A and monomer B, in which the monomer A has an average side chain carbon number greater than that of the monomer B. In order to allow the addition amount of each of the two monomers to simultaneously satisfy the relationship (V) and the relationship (VI), the addition amount of the monomer B is maintained constant while gradually increasing the addition amount of the monomer A from the starting time $t_0$ to the moment of time $t_j$ of the addition of the two monomers to the polymerization system, and then the addition amount of the monomer B is gradually reduced while maintaining the addition amount of the monomer A constant from the moment of time $t_j$ to the termination time $t_m$ of the addition of monomers.

According to an aspect of the present application, as shown in the relationship (VI), the value of the addition-amount ratio exhibits an increase from $G_0/G$ to $G_j/G$, such as a gradual increase or a linear increase. The present application has no particular requirement on the incremental magnitude (also referred to as the step size) between any two adjacent values in the increasing series, as long as it is considered by those skilled in the art to be an effective increment. Moreover, the increase may be an increment in equal step sizes, or an increase in unequal step sizes, with no particular limitation in the present application. As the step size, it may be generally, for example, any value within a rang from 0.05% to 20%, or any value within a rang from 0.1% to 5%, but is not limited thereto.

According to an aspect of the present application, as the addition-amount ratio $G_0/G$, it represents the ratio of the (instantaneous) total addition amount of the at least two monomers at the starting time $t_0$ of the addition the at least two monomers to the polymerization system to the total addition amount G of the at least two monomers through the entire addition time t, and also denotes the starting point and the minimum value of the whole increasing series, which may be, for example, any value within a rang from 0.01% to 20%, or any value within a rang from 0.1% to 10%, but is not limited thereto. Further, as the addition-amount ratio $G_j/G$, it represents the ratio of the (instantaneous) total addition amount of the at least two monomers at the moment of time $t_j$ to the total addition amount G, and also denotes the end point and the maximum value of the whole increasing series, which may be, for example, any value within a rang from 20% to 75%, or any value within a rang from 25% to 65%, but is not limited thereto.

According to an aspect of the present application, as shown in the relationship (VI), the value of the addition-amount ratio exhibits a decrease from $G_j/G$ to $G_m/G$, such as a gradual decrease or a linear decrease. The present application has no particular requirement on the decremental magnitude (also referred to as the step size) between any two adjacent values in the decreasing series, as long as it is considered by those skilled in the art to be an effective decrement. Moreover, the decrease may be a decrement in equal step sizes or a decrement in unequal step sizes, with no particular limitation in the present application. As the step size, it may be generally, for example, any value within a rang from 0.05% to 20%, or any value within a rang from 0.1% to 5%, but is not limited thereto.

According to an aspect of the present application, as the addition-amount ratio $G_j/G$, it represents the ratio of the (instantaneous) total addition amount of the at least two monomers at the moment of time $t_j$ of the addition of monomers to the total addition amount G, and also denotes the starting point and the maximum value of the whole decreasing series, which may be, for example, any value within a rang from 20% to 75%, or any value within a rang from 25% to 65%, but is not limited thereto. Further, as the addition-amount ratio $G_m/G$, it represents the ratio of the (instantaneous) total addition amount of the at least two monomers at the termination time $t_m$ of the addition of the at least two monomers to the polymerization system to the total addition amount G, and also denotes the end point and the minimum value of the whole decreasing series, which may be, for example, any value within a rang from 0.01% to 20%, or from 0.1% to 10%, but is not limited thereto.

According to an aspect of the present application, the addition-amount ratio $G_m/G$ and the addition-amount ratio $G_0/G$ may be the same or different, with no particular limitation in the present application.

According to an aspect of the present application, as shown by the relationship (VI), the value of the addition-amount ratio exhibits a distribution of low intermediate height on both sides from $G_0/G$ to $G_m/G$, which is very similar to a Gaussian distribution. Therefore, according to an embodiment of the present application, in an ideal state, where the value of the addition-amount ratio is taken as the ordinate, and the value of the average side chain carbon number X is taken as the abscissa, the change of the relationship between these two parameters of the at least two monomers from the starting time $t_0$ to the termination time $t_m$ of the addition of the at least two monomers to the polymerization system conforms to or substantially conforms to the Gaussian distribution, as shown, for example, in the equation (VII). Here, the expression "substantially conform" means that the relationship between the two parameters may be slightly deviated from the Gaussian distribution as shown in the equation (VII), with a deviation within the range acceptable to those skilled in the art.

$$G_x/G = f(X_x) = \frac{1}{\sqrt{2\pi}\,\sigma} e^{-\frac{(X_x - \mu)^2}{2\sigma^2}} \quad \text{(VII)}$$

According to an aspect of the present application, in the equation (VII), the symbol x represents an arbitrary integer from 0 to m, and the symbol t represents an arbitrary value within the open interval (12.5, 14.2), preferably an arbitrary value within the open interval (12.6, 13.8), the symbol σ represents an arbitrary value within the open interval (0.5, 2). The symbol π is the pi, which can generally be 3.141592654 or 3.14, and the symbol e is the natural constant and can generally be 2.718281828 or 2.72.

According to an aspect of the present application, there is also provided a method for controlling copolymerization. The copolymerization is an addition copolymerization, particularly a radical addition copolymerization, occurred in a polymerization system to which at least two monomers are added. Since the control method can be used to control or specifically control the implementation of the production method A, any aspect, feature, range, information or the like related to the control method can be directly applied to the corresponding part of the production method A, in addition to what is explicitly described in the following aspects, and details are not described herein again.

According to an aspect of the present application, the control method comprises a step of adjusting the relative ratio between the at least two monomers added to the polymerization system at any moment of time $t_x$, the symbol x representing an arbitrary integer from 0 to m, during the addition of monomers, such that the average side chain carbon number $X_x$ as determined according to the nuclear magnetic resonance method of a (hypothetical) mixture composed of the at least two monomers at the relative ratio satisfies the following relationship.

$$X_0 < X_1 < \ldots < X_{m-1} < X_m \quad (V)$$

According to an aspect of the present application, the control method may further comprise a step of adjusting the sum $G_x$ of the addition amounts of the at least two monomers to the polymerization system at the moment of time $t_x$, such that the ratio $G_x/G$ satisfies the following relationship.

$$G_0/G < G_1/G < \ldots < G_j/G > \ldots > G_{m-1}/G > G_m/G \quad (VI)$$

According to an aspect of the present application, the adjusting step or the control manner can be implemented by any means known in the art, and examples thereof include a combination of a flow control valve and a PLC control circuit, and are not particularly limited.

According to an aspect of the present application, the method for producing the gradient copolymer comprises the step of mixing p polymer components. Hereinafter, such a production method is sometimes referred to as production method B.

According to an aspect of the present application, the p polymer components have been produced in advance. Here, the p polymer components may be produced according to any method known in the art, or according to the production method A as described hereinbefore, or may be obtained commercially without particular limitation. Then, the p polymer components may be mixed together by any means known in the art to obtain a gradient copolymer. The gradient copolymer may comprise the gradient copolymer described in various aspects of the specification of the present application.

According to an aspect of the present application, the p polymer components each independently represents an addition polymer (hereinafter referred to as polymer B), in particular a radical addition polymer, of a monomer of the formula (I). Here, the polymer B may be a homopolymer of a single monomer of the formula (I), or a copolymer of two or more monomers of the formula (I). Examples of the copolymer include random copolymers, block copolymers, alternating copolymers, and the like. Moreover, a mixture of two or more polymers B may also be used as the polymer component. Under such circumstances, one or more of the p polymer components may also be a mixture of two or more polymers B.

According to this aspect of the present application, the polymer B or the p polymer components each independently comprises one or more structural units represented by the formula (I-1) (hereinafter sometimes referred to simply as specific structural unit), or consists essentially of one or more of the specific structural units. It is apparent that the structural unit represented by the formula (I-1) is derived from the monomer of the formula (I). Here, the term "essentially" means 85% or more, preferably 90% or more, and more preferably 95% or more by mole. The remainder of the polymer structure may be other structural unit than the specific structural units or an end group, but is generally an end group such as, for example, an initiator residue or the like.

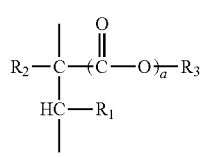
(I-1)

According to an aspect of the present application, the number average molecular weights Mn of the p polymer components are each independently from 10,000 to 1,000,000, preferably from 10,000 to 500,000, more preferably from 10,000 to 100,000.

According to an aspect of the present application, the molecular weight distribution Mw/Mn of the p polymer components are each independently from 1.8 to 3.5, preferably from 1.9 to 3.3.

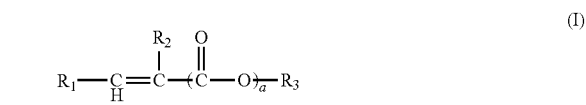
(I)

According to an aspect of the present application, in the formula (I) or formula (I-1), the group $R_1$ represents H or

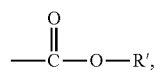

preferably H. Here, the group R' represents H or a group $R_3$, preferably the group $R_3$.

According to an aspect of the present application, in the formula (I) or formula (I-1), the group $R_2$ represents H or $C_{1-4}$ linear or branched alkyl, preferably H or methyl.

According to an aspect of the present application, in the formula (I) or formula (I-1), the symbol a represents 0 or 1, preferably 1.

According to an aspect of the present application, in the formula (I) or formula (I-1), the group $R_3$ represents a $C_1$-$C_{30}$ linear or branched alkyl group, preferably a $C_6$-$C_{24}$ linear or branched alkyl group, more preferably a $C_6$-$C_{20}$ linear alkyl group or a $C_8$-$C_{24}$ linear alkyl group.

According to an aspect of the present application, it is preferred that for one or more of the polymer B or the p polymer components, the proportion (by mole) of the specific structural unit, in which the group $R_3$ represents a $C_{10}$-$C_{18}$ linear or branched alkyl group, relative to the total amount of the structural units constituting those polymers is generally from 40% to 95%, preferably from 55% to 95%.

According to an aspect of the present application, as the monomer of the formula (I), for example, a mono-$C_1$-$C_{30}$ linear or branched alkyl fumarate, a di-$C_1$-$C_{30}$ linear or branched alkyl fumarate, a $C_3$-$C_{30}$ linear or branched α-olefin, and a $C_1$-$C_{30}$ linear or branched alkyl (meth)acrylate may be mentioned. Particularly, for example, a mono-$C_8$-$C_{24}$ linear or branched alkyl fumarate, a di-$C_8$-$C_{24}$ linear or branched alkyl fumarate, a $C_6$-$C_{20}$ linear or branched α-olefin, and a $C_6$-$C_{20}$ linear or branched alkyl (meth)acrylate may be mentioned. More particularly, for example, a mono-$C_8$-$C_{24}$ linear alkyl fumarate, a di-$C_8$-$C_{24}$ linear alkyl fumarate, a $C_6$-$C_{20}$ linear α-olefin, and a $C_6$-$C_{20}$ linear alkyl (meth)acrylate may be mentioned. Those monomers may be used alone or in a combination of two or more thereof at any ratio.

According to an aspect of the present application, as the mono-$C_8$-$C_{24}$ linear or branched alkyl fumarate, for example, a mono-$C_8$ linear alkyl fumarate, a mono-$C_{10}$ linear alkyl fumarate, a mono-$C_{12}$ linear alkyl fumarate, a mono-$C_{14}$ linear alkyl fumarate, a mono-$C_{16}$ linear alkyl fumarate, a mono-$C_{18}$ linear alkyl fumarate, a mono-$C_{20}$ linear alkyl fumarate, a mono-$C_{22}$ linear alkyl fumarate, and a mono-$C_{24}$ linear alkyl fumarate may be mentioned. Those mono-$C_8$-$C_{24}$ linear or branched alkyl fumarates may be used alone or in a combination of two or more thereof at any ratio.

According to an aspect of the present application, as the di-$C_8$-$C_{24}$ linear or branched alkyl fumarate, for example, a di-$C_8$ linear alkyl fumarate, a di-$C_{10}$ linear alkyl fumarate, a di-$C_{12}$ linear alkyl fumarate, a di-$C_{14}$ linear alkyl fumarate, a di-$C_{16}$ linear alkyl fumarate, a di-$C_{18}$ linear alkyl fumarate, a di-$C_{20}$ linear alkyl fumarate, a di-$C_{22}$ linear alkyl fumarate, and a di-$C_{24}$ linear alkyl fumarate may be mentioned. Those di-$C_8$-$C_{24}$ linear or branched alkyl fumarates may be used alone or in a combination of two or more thereof at any ratio.

According to an aspect of the present application, as the $C_6$-$C_{20}$ linear or branched α-olefin, for example, 1-hexene, 1-octene, 1-decene, 1-dodecene, 1-tetradecene, 1-hexadecene, 1-octadecene and 1-eicosene may be mentioned. Those $C_6$-$C_{20}$ linear or branched α-olefins may be used alone or in a combination of two or more thereof at any ratio.

According to an aspect of the present application, as the $C_6$-$C_{20}$ linear or branched alkyl (meth)acrylate, for example, a $C_6$ linear alkyl (meth)acrylate, a $C_8$ linear alkyl (meth)acrylate, a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be mentioned. Those $C_6$-$C_{20}$ linear or branched alkyl (meth)acrylates may be used alone or in a combination of two or more thereof at any ratio.

According to an aspect of the present application, as the $C_6$-$C_{20}$ linear or branched (meth)acrylate, for example, a combination of two or more of a $C_6$ linear alkyl (meth)acrylate, a $C_8$ linear alkyl (meth)acrylate, a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, and a $C_{18}$ linear alkyl (meth)acrylate may be used, or a combination of two or more of a $C_8$ linear alkyl (meth)acrylate, a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be used, or a combination of two or more of a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be used, preferably a combination of two or more of a $C_{12}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be used, or a combination of two or more of a $C_{10}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be used, or a combination of two or more of a $C_8$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate may be used.

According to an aspect of the present application, where the average side chain carbon number of the i-th polymer component is expressed as $X_i$, with the symbol i representing an arbitrary integer from 1 to p, the following relationship is established. It is known from the following relationship that the p polymer components are different in structure and/or composition from each other, and the difference manifests at least as the different average side chain carbon numbers.

$$X_1 < X_2 < \ldots < X_{p-1} < X_p \quad \text{(VIII)}$$

According to an aspect of the present application, the symbol p represents an integer from to 10000, preferably an integer from 8 to 5000, or an integer from 5 to 20.

According to an aspect of the present application, as shown in the relationship (VIII), the value of the average side chain carbon number X exhibits an increase from $X_1$ to $X_p$, such as a gradual increase or a linear increase. The present application has no particular requirement on the incremental magnitude (also referred to as the step size) between any adjacent two Xs in the increasing series, as long as it is considered by those skilled in the art to be an effective increment. Moreover, the increase may be an increment in equal step sizes, or an increment in unequal step sizes, with no particular limitation in the present application. As the step size, it may be generally, for example, any value within a rang from 0.01 to 4.00, or any value within a rang from 0.05 to 1.5, but is not limited thereto.

According to an aspect of the present application, as said $X_1$, it denotes the starting point and the minimum value of the whole increasing series, which may be, for example, any value within a rang from 6.5 to 12.5, or any value within a rang from 7.8 to 12.0, but is not limited thereto. In addition, as said $X_p$, it denotes the end point and the maximum value of the whole increasing series, which may be, for example, any value within a rang from 13.8 to 19.5, or any value within a rang from 14.5 to 18.2, but is not limited thereto.

According to an aspect of the present application, where the weight percentage of the i-th polymer component relative to the total weight of the p polymer components (hereinafter sometimes referred to simply as the component ratio) is expressed as $Y_i$, with the symbol i representing an arbitrary integer from 1 to p, the following relationship holds.

$$Y_1 < Y_2 < \ldots < Y_j > \ldots > Y_{p-1} > Y_p \quad \text{(X)}$$

According to an aspect of the present application, in the relationship (X), the symbol j represents an integer within the closed interval $[(p+1)/4, 3(p+1)/4]$, preferably an integer within the closed interval $[(p+1)/3, 2(p+1)/3]$, more preferably an integer within the closed interval $[2(p+1)/5, 3(p+1)/5]$, and $Y_1+Y_2+\ldots+Y_j+\ldots+Y_{p-1}+Y_p=100\%$.

According to an aspect of the present application, as shown in the relationship (X), the value of the component ratio Y exhibits an increase from $Y_1$ to $Y_j$, such as a gradual increase or a linear increase. The present application has no particular requirement on the incremental magnitude (also referred to as the step size) between any two adjacent Ys in the increasing series, as long as it is considered by those skilled in the art to be an effective increment. Moreover, the increase may be an increment in equal step sizes, or an increment in unequal step sizes, with no particular limitation in the present application. As the step size, it may be generally, for example, any value within a rang from 0.05% to 20%, or any value within a rang from 0.1% to 5%, but is not limited thereto.

According to an aspect of the present application, as said $Y_i$, it denotes the starting point and the minimum value of the whole increasing series, which may be, for example, any value within a rang from 0.01% to 20%, or from 0.1% to 10%, but is not limited thereto. In addition, as said $Y_j$, it denotes the end point and the maximum value of the whole increasing series, which may be, for example, any value within a rang from 20% to 75%, or any value within a rang from 25% to 65%, but is not limited thereto.

According to an aspect of the present application, as shown in the relationship (X), the value of the component ratio Y exhibits a decrease from $Y_j$ to $Y_p$, such as a gradual decrease or a linear decrease. The present application has no particular requirement on the decremental magnitude (also referred to as the step size) between any two adjacent Ys in the decreasing series, as long as it is considered by those skilled in the art to be an effective decrement. Moreover, the decrease may be a decrement in equal step sizes or a decrement in unequal step sizes, with no particular limitation in the present application. As the step size, it may be generally, for example, any value within a rang from 0.05% to 20%, or any value within a rang from 0.1% to 5%, but is not limited thereto.

According to an aspect of the present application, as said $Y_j$, according to the description hereinabove, it denotes the starting point and the maximum value of the whole decreasing series, which may be, for example, any value within a rang from 20% to 75%, or any value within a rang from 25% to 65%, but is not limited thereto. Further, as said $Y_p$, it denotes the end point and the minimum value of the whole decreasing series, which may be, for example, any value within a rang from 0.01% to 20%, or any value within a rang from 0.1% to 10%, but is not limited thereto.

According to an aspect of the present application, the $Y_p$ may be the same as or different from the $Y_1$, with no particular limitation in the present application.

According to an aspect of the present application, as shown in the relationship (X), the value of the component ratio Y exhibits a distribution with low intermediate height on both sides from $Y_1$ to $Y_p$, which is very similar to a Gaussian distribution. Accordingly, according to an embodiment of the present application, in an ideal state, where the value of the component ratio Y is taken as the ordinate, and the value of the average side chain carbon number X is taken as the abscissa, the change of the relationship between these two parameters of the polymer component from the first one to the p-th one conforms to or substantially conforms to the Gaussian distribution, as shown, for example, in the equation (XI). Here, the expression "substantially conform" means that the relationship between the two parameters may be slightly deviated from the Gaussian distribution as shown in the equation (XI), with a deviation within the range acceptable to those skilled in the art.

$$Y_i = f(X_i) = \frac{1}{\sqrt{2\pi}\,\sigma} e^{-\frac{(X_i-\mu)^2}{2\sigma^2}} \quad (XI)$$

According to an aspect of the present application, in the equation (XI), the symbol μ represents an arbitrary value within the open interval (12.5, 14.2), preferably an arbitrary value within the open interval (12.6, 13.8), and the symbol σ represents an arbitrary value within the open interval (0.5, 2). The symbol π is the pi, which can generally be 3.141592654 or 3.14, and the symbol e is the natural constant, which can generally be 2.718281828 or 2.72.

According to an aspect of the present application, there is also provided a polymer composition. Here, the polymer composition comprises the gradient copolymer described in the various aspects of the present specification, or the gradient copolymer produced according to the production method described in the various aspects of the present specification. The polymer composition may further comprise some additional components depending on the intended use or the desired property and performance. As said additional components, various materials that may be considered useful by those skilled in the art, such as an antioxidant, a lubricant, a solvent, a diluent, a filler, an additional polymer other than the gradient copolymer, a pigment, and the like, may be mentioned. Moreover, the selection of those additional components can be made routinely by those skilled in the art. As said additional polymer, for example, a poly(meth)acrylate homopolymer or copolymer, an α-olefin homopolymer or copolymer, a fumarate homopolymer or copolymer, a vinyl acetate homopolymer or copolymer, and the like may be mentioned. Those additional components may be used alone or in a combination of two or more thereof at any ratio.

According to an aspect of the present application, the polymer composition can be a pour point depressant for lubricating oils. Here, the pour point depressant for lubricating oils comprises a gradient copolymer described in the various aspects of the present specification, or a gradient copolymer produced according to the production method described in the various aspects of the present specification. Under such circumstances, the present application also relates to the use of the gradient copolymer described in the various aspects of the present specification, or the gradient copolymer produced according to the production method described in the various aspects of the present specification as a pour point depressant for lubricating oils. It should be particularly noted that the gradient copolymer or the pour point depressant for lubricating oils can provide an excellent pour point depressing efficacy for lubricating oils. The pour point depressant for lubricating oils may further comprise additional components depending on the desired property and performance and the like. As the additional component, for example, an antioxidant, a lubricant, a solvent, a diluent, an additional pour point depressant other than the gradient copolymer, and the like, can be mentioned, the selection of which can be made routinely by those skilled in the art. Those additional components may be used alone or in a combination of two or more thereof at any ratio.

According to an aspect of the present application, there is also provided a lubricating oil composition. Here, the lubricating oil composition comprises the gradient copolymer described in the various aspects of the present specification, the gradient copolymer produced according to the production method described in the various aspects of the present specification, the polymer composition described in the various aspects of the present specification, or the pour point depressant for lubricating oils described in the various aspects of the present specification, and a lubricating base oil.

According to an aspect of the present application, the content by weight of the gradient copolymer, the polymer composition or the pour point depressant for lubricating oils, calculated on the basis of the gradient copolymer, in the lubricating base oil may be generally from 0.01% by weight to 2% by weight, preferably from 0.05% by weight to 1.5% by weight, more preferably from 0.1% by weight to 1% by weight.

According to an aspect of the present application, the lubricating base oil may be various lubricating base oils of different origin, whereby the gradient copolymer exhibits a broad adaptability to various lubricating base oils when used as a pour point depressant. As the lubricating base oil, for example, an API Class I mineral base oil, an API Class II/III hydrogenated base oil, or a lubricating oil containing one or more of those base oils may be mentioned. In addition, the lubricating base oil may further comprise an additional base oil other than the API Class I or AP Class II/III base oil, of which the examples include API Class IV synthetic oil, API Class V synthetic oil or GTL synthetic base oil. Those lubricating base oils may be used alone or in a combination of two or more thereof at any ratio.

According to an aspect of the present application, the lubricating oil composition may further comprise an additional component. As the additional component, for example, various additives suitable for use in lubricating oil compositions in the art may be mentioned, of which the examples include phenol-, amine- or sulfur-phosphorus-based antioxidants, carboxylate-, sulfonate- or alkyl phenate-based detergent, succinimide-based ashless dispersant, polyester-, polyolefin- or alkyl naphthalene-based pour point depressant, methacrylate copolymer, ethylene propylene copolymer, polyisobutylene- or hydrogenated styrene/butadiene copolymer-based viscosity index improver, sulfur/phosphorus-based friction modifier, sulfur/phosphorus-containing, boric acid-based extreme pressure agent, or silicon-based, non-silicon-based antifoaming agent, and the like. The types and amounts of those additives are well known to those skilled in the art and will not be described in detail herein. Those additives may be used alone or in a combination of two or more thereof at any ratio.

Example

The present application will be further illustrated with reference to the following examples, but is not limited thereto.

In the following examples and comparative examples, the contents of the copolymer and the diluent oil, as well as the content of each monomer in the copolymer, were calculated in accordance with the feed amounts thereof, respectively.

In the context of the present application, including the following examples and comparative examples, the measurement methods and calculation methods were carried out as follows.

1. Gel Permeation Chromatography (GPC) Resolution

Instrument: Model 1515 gel permeation chromatograph manufactured by Waters, USA. The detector was a Waters 2414 Refractive Index Detector. The solvent used for the preparation of the standard was chromatographically pure tetrahydrofuran from Acros. The column was supplied by Waters, and was composed of three silica gel columns having different pore sizes that are connected in series, of which the specifications are as follows:

(1) Waters Styragel® HR 0.5 THF, having a relative molecular weight measurement range of 1-1000 (7.8×300 mm), (2) Waters Styragel® HR 1 THF, having a relative molecular weight measurement range of 100-5000 (7.8×300 mm), and (3) Waters Styragel® HR 3 THF, having a relative molecular weight measurement range of 5000-600,000 (7.8×300 mm).

Conditions: the mobile phase was tetrahydrofuran, the mobile phase flow rate was 1.0 mL/min, the column temperature was 35° C., the detector temperature was 35° C., and the injection volume was 200 μL.

Steps: 0.02 to 0.2 g of the sample was dissolved in 10 mL of tetrahydrofuran, and shaken to obtain a homogeneous solution. The solution was then subjected to GPC analysis on the instrument under the above-described conditions. From the beginning of the appearance of a chromatographic peak on the gel chromatogram till the end of the chromatographic peak, volumetric flasks were used to collect the effluent from the detector outlet, in which the effluent was collected in n stages by dividing the cumulative peak time of the chromatographic peak into n equal parts. The effluents collected in n stages were labeled as $L_1$, $L_2$, ..., $L_n$, respectively. The above operation was repeated for 10 times, and the effluents collected in the same stage at different times were combined. Then, tetrahydrofuran was removed from each of the effluents collected in different stages by distillation at 80° C. to obtain n fractions collected in different stages, which were weighed separately. The number average molecular weight Mn and the molecular weight distribution Mw/Mn of each fraction were measured, and the weight percentage of each faction relative to the total weight of the n fractions, i.e. the component ratio Y, was calculated.

2. Nuclear Magnetic Resonance Analysis

Instrument: INOVA 500 MHz NMR spectrometer ($^1$H-NMR) produced by Varian Company, USA, using a solid double resonance probe (5 mm).

Conditions: room temperature, scanning times nt=1000, chemical displacement calibration δ tetramethyl silane=0, decoupling mode dm=nny (anti-gated decoupling), heavy water lock field.

Steps: the sample was subjected to $^1$H-NMR characterization, and the average side chain carbon number X of the sample was calculated by analyzing the corresponding nuclear magnetic resonance spectrum.

Hereinafter, the analysis of the nuclear magnetic spectrum and the calculation of the average side chain carbon number X will be specifically described using a methacrylate polymer, an acrylate polymer, a fumarate polymer, and an α-olefin polymer, respectively, as examples, but the present application is not limited thereto. Other polymers can also be subjected to the analysis and calculation in a similar way with reference to the corresponding contents.

By way of example only, the methacrylate polymer or the acrylate polymer typically comprises a structural unit as shown below.

NMR $^1$H Estimation

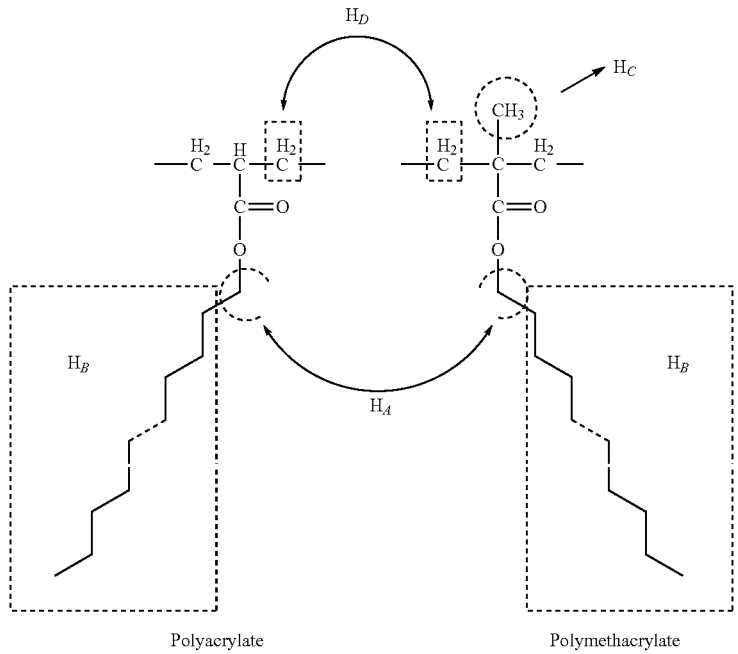

Polyacrylate          Polymethacrylate

According to the obvious difference shown in the $^1$H-NMR spectrum, for the methacrylate polymer, the hydrogen atoms in the structural unit can be roughly divided into four categories of $H_A$, $H_B$, $H_C$, and $H_D$ as shown above, having the relationship as shown in the equation (1). Since the chemical shift of the $H_C$ is covered by $H_B$ and that of $H_D$ is difficult to be integrated, $H_B$, $H_C$ and $H_D$ can be consolidated for calculation. Therefore, the equation (1) can be transformed into the equation (2) and further derived into the equation (3).

$$H_A = H_D = \frac{2}{3}H_C = \frac{2}{2X-1}H_B \quad (1)$$

$$\frac{2}{2X+4} = \frac{H_A}{H_B + H_C + H_D} \quad (2)$$

$$X = \frac{H_B + H_C + H_D}{H_A} - 2 \quad (3)$$

In those equations, X represents the average side chain carbon number of the methacrylate polymer.

Similar to the analysis of the methacrylate polymer, the hydrogen atoms in the structural unit of the acrylate polymer can be roughly divided into three categories of $H_A$, $H_B$, and $H_D$ as shown above. Also, the average side chain carbon number X of the acrylate polymer can be calculated as shown in the equation (4).

$$X = \frac{H_B + H_D}{H_A} - \frac{1}{2} \quad (4)$$

By way of example only, the fumarate polymer typically comprises a structural unit as shown below.

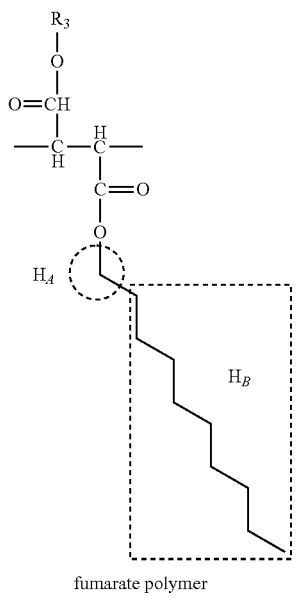

fumarate polymer

Similar to the analysis of the methacrylate polymer, the average side chain carbon number X of the fumarate polymer can be calculated as shown in the equation (5).

$$X = \frac{H_B}{H_A} + \frac{1}{2} \quad (5)$$

By way of example only, the α-olefin polymer typically comprises a structural unit as shown below.

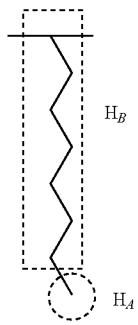

Similar to the analysis of the methacrylate polymer, the average side chain carbon number X of the α-olefin polymer can be calculated as shown in the equation (6).

$$X = \frac{3H_B}{2H_A} + 1 \quad (6)$$

For example, if a methacrylate polymer has a nuclear magnetic spectrum and integral data as shown in FIG. 1, as can be determined via calculation in accordance with the equation (3), the methacrylate polymer has an average side chain carbon number X=14.86.

In the following examples and comparative examples, the properties of the lubricating base oils A to F are shown in Table A.

TABLE A

| Base oil No. | A | B | C |
|---|---|---|---|
| Class | API-II 6 | API-III6 | 150SN |
| Viscosity at 100° C. | 5.67 | 5.54 | 5.46 |
| Viscosity index | 112 | 121 | 90 |
| Pour point/° C. | −18 | −15 | −15 |

Example A

Under nitrogen protection, 113 kg of diluent oil (purchased from Ssangyong Corporation, grade 100N, the same below) was added to a reactor equipped with mechanical stirring, and heated to 83-91° C. A mixture A of 270 kg of a first monomer (a mixture of decyl methacrylate/dodecyl methacrylate/tetradecyl methacrylate/cetyl methacrylate/octadecyl methacrylate, where $C_{10}$=61%, $C_{12}$=20%, $C_{14}$=12%, $C_{16}$=5%, $C_{18}$=2%, X=11.1), 1.35 kg of benzoyl peroxide and 1.08 kg of dodecyl mercaptan was added dropwise to the reaction vessel, and, at the same time, a mixture B of 150 kg of a second monomer (a mixture of tetradecyl methacrylate/cetyl methacrylate/octadecyl methacrylate/eicosyl methacrylate, where $C_{14}$=27 wt %, $C_{16}$=42%, $C_{18}$=24%, $C_{20}$=7 wt %, X=16.0), 0.75 kg of benzoyl peroxide and 0.6 kg of dodecyl mercaptan was added dropwise to the reaction vessel. At the starting time of the dropwise addition, the ratio A/B of the dropwise addition amount (kg/hr) of the mixture A to the dropwise addition amount (kg/hr) of the mixture B was 4:1, and the sum of the two was 20 kg/hr. Then, the ratio A/B was gradually decreased, and the sum of the two was gradually increased till 3 hours of dropwise addition, when the ratio A/B reached 5:3, and the sum of the two reached 80 kg/hr. Then, the ratio A/B was gradually decreased, and the sum of the two was gradually decreased till 6 hours of dropwise addition, when the ratio A/B reached 1:2, and the sum of the two reached 15 kg/hr, and then the dropwise addition was terminated. After that, the reaction vessel was kept at 95° C. for 1 hour, and then 0.3 kg of benzoyl peroxide and 113 kg of diluent oil were added, and the mixture was heated to 103° C. for 2 hours, and then the polymerization reaction was terminated to obtain a gradient copolymer J1. Here, the monomer conversion of the polymerization reaction was 99.1%, the number average molecular weight Mn of the gradient copolymer J1 was 47,120, and the average side chain carbon number X was 12.5. The gradient copolymer J1 was used as a sample, and was subjected to GPC resolution to obtain 5 fractions in stages. The 5 fractions obtained in stages were analyzed separately, and the results are shown in Table 1.

TABLE 1

| | Item | | | | |
|---|---|---|---|---|---|
| | 1 | 2 | 3 | 4 | 5 |
| Component ratio, Y/% | 7.1 | 16.7 | 50 | 16.7 | 9.5 |
| Average side chain carbon number (X) | 12.21 | 12.42 | 12.80 | 13.71 | 14.13 |
| Number average molecular weight (Mn) | 21542 | 35411 | 48214 | 54525 | 65214 |

Example B

Under the protection of nitrogen, 113 kg of diluent oil (purchased from Ssangyong Corporation, grade 100N, the same below) was added to a reactor equipped with mechanical stirring, and heated to 83-91° C. A mixture A of 50 kg of a first monomer (a mixture of hexyl methacrylate/octyl methacrylate/decyl methacrylate, where $C_6$=71%, $C_8$=21%, $C_{10}$=8%, X=6.6), 0.32 kg of benzoyl peroxide and 0.21 kg of dodecyl mercaptan was added dropwise to the reaction vessel, and, at the same time, a mixture B of 370 kg of a second monomer (a mixture of dodecyl methacrylate/tetradecyl methacrylate/cetyl methacrylate, where $C_{12}$=55 wt %, $C_{14}$=17 wt %, $C_{16}$=28 wt %, X=13.3), 1.8 kg of benzoyl peroxide and 1.5 kg of dodecyl mercaptan was added dropwise to the reaction vessel. At the starting time of the dropwise addition, the ratio A/B of the dropwise addition amount (kg/hr) of the mixture A to the dropwise addition amount (kg/hr) of the mixture B was 7:1, and the sum of the two was 12 kg/hr. Then, the ratio A/B was gradually decreased, and the sum of the two was gradually increased till 3 hours of dropwise addition, when the ratio A/B reached 1:10, and the sum of the two reached 150 kg/hr. Then, the ratio A/B was gradually decreased, and the sum of the two was gradually decreased till 6 hours of dropwise addition, when the ratio A/B reached 1:20, and the sum of the two reached 20 kg/hr, and then the dropwise addition was terminated. After that, the reaction vessel was kept at 95° C. for 1 hour, and then 0.3 kg of benzoyl peroxide and 113 kg of diluent oil were added, and the temperature was raised to 103° C. for 2 hours, and the polymerization reaction was terminated to obtain a gradient copolymer J2. Here, the monomer conversion of the polymerization reaction was 98.3%, the number average molecular weight Mn of the gradient copolymer J2 was 45,975, and the average side chain carbon number X was 12.0. The gradient copolymer J2 was used as a sample, and was subjected to GPC resolution to obtain 8 fractions in stages. The 8 fractions obtained in stages were analyzed separately, and the results are shown in Table 2.

Comparative Example A

A gradient copolymer was prepared according to the method as described in Example A, except that the first monomer and the second monomer were uniformly mixed and then added dropwise to the reaction system at a constant rate. The detailed process is as follows.

Under nitrogen protection, 113 kg of diluent oil was added to a reactor equipped with mechanical stirring, and heated to 83-91° C. A mixture of 270 kg of a first monomer (a mixture of decyl methacrylate/dodecyl methacrylate/tetradecyl methacrylate/hexadecyl methacrylate/octadecyl methacrylate, where $C_{10}$=61%, $C_{12}$=20%, $C_{14}$=12%, $C_{16}$=5%, $C_{18}$=2%, X=11.1), 150 kg of a second monomer (a mixture of tetradecyl methacrylate/cetyl methacrylate/octadecyl methacrylate/eicosyl methacrylate, where $C_{14}$=27 wt %, $C_{16}$=42%, $C_{18}$=24%, $C_{20}$=7 wt %, X=16.0), 2.1 kg of benzoyl peroxide and 1.68 kg of dodecyl mercaptan was added dropwise to the reaction vessel at a constant rate of 70 kg/hour, till 6 hours of dropwise addition. After the completion of the dropwise addition, the reaction vessel was kept at 95° C. for 1 hour, then 0.3 kg of benzoyl peroxide and 113 kg of diluent oil were added, the temperature was raised to 103° C. for 2 hours, and the reaction was terminated to obtain a copolymer DJ1. Here, the monomer conversion of the polymerization reaction was 99.3%, the number average molecular weight Mn of the copolymer DJ1 was 41,768, and the average side chain carbon number X was 12.5. The copolymer DJ1 was used as a sample, and was subjected to GPC resolution to obtain 5 fractions in stages. The 5 fractions obtained in stages were analyzed separately, and the results are shown in Table 3.

TABLE 2

| | Item | | | | | | | |
|---|---|---|---|---|---|---|---|---|
| | 1 | 2 | 3 | 4 | 5 | 6 | 7 | 8 |
| Component ratio, Y/% | 4.2 | 5.9 | 8.5 | 9.6 | 43.1 | 14.4 | 8.4 | 6.0 |
| Average side chain carbon number (X) | 7.30 | 9.84 | 11.17 | 11.82 | 12.44 | 12.65 | 12.70 | 12.89 |
| Number average molecular weight (Mn) | 19542 | 25057 | 31124 | 38512 | 44215 | 47045 | 50215 | 59021 |

TABLE 3

| | Item | | | | |
|---|---|---|---|---|---|
| | 1 | 2 | 3 | 4 | 5 |
| Component ratio, Y/% | 13.2 | 17.5 | 30.0 | 21.1 | 18.2 |
| Average side chain carbon number (X) | 12.41 | 12.54 | 12.54 | 12.47 | 12.40 |
| Number average molecular weight (Mn) | 32154 | 39024 | 45145 | 52153 | 59213 |

Example C

Under nitrogen protection, 113 kg of diluent oil (purchased from Ssangyong Corporation, grade 100N, the same below) was added to a reactor equipped with mechanical stirring, and heated to 83-91° C. A mixture A of 150 kg of a first monomer (a mixture of decyl methacrylate/dodecyl methacrylate, where $C_{10}$=50%, $C_{12}$=50%, X=10.9), 0.75 kg of benzoyl peroxide and 0.7 kg of dodecyl mercaptan was added dropwise to the reaction vessel. In the first 4 hours, the feed rate of the first monomer mixture was kept at a constant rate of 10 kg/hour, and, at the same time, a mixture B of 100 kg of a second monomer (a mixture of dodecyl methacrylate/tetradecane methacrylate, where $C_{12}$=70 wt %, $C_{14}$=30%, X=12.5), 0.6 kg of benzoyl peroxide and 0.55 kg of dodecyl mercaptan was added dropwise to the reaction vessel. At the starting time of the dropwise addition, the ratio A/B of the dropwise addition amount (kg/hr) of the mixture A to the dropwise addition amount (kg/hr) of the mixture B was 2:1, and the sum of the two was 15 kg/hr, and then the mixture B was gradually increased, and the sum of the two was gradually increased till 4 hours of dropwise addition, when the ratio A/B reached 1:3, and the sum of the two reached 80 kg/hr. At this moment, the feed of the second monomer was terminated, and a mixture C of 170 kg of a third monomer (a mixture of tetradecyl methacrylate/hexadecyl methacrylate/octadecyl methacrylate, where $C_{14}$=64 wt %, $C_{16}$=25%, $C_{18}$=11%, X=14.8), 0.8 kg of benzoyl peroxide and 0.7 kg of dodecyl mercaptan was added dropwise to the reaction vessel. At this moment, the ratio A/C of the dropwise addition amount (kg/hr) of the mixture A to the dropwise addition amount (kg/hr) of the mixture C was 1:2, and the sum of the two was 100 kg/hr. Then, the mixture A was gradually decreased, and the sum of the two was gradually decreased till additional 5 hours of dropwise addition, when the A/C reached 1:3, and the sum of the two reached 10 kg/hr, and the addition was terminated. After that, the reaction vessel was kept at 95° C. for 1 hour, and then 0.5 kg of benzoyl peroxide and 113 kg of diluent oil were added, and the mixture was heated to 103° C. for 2 hours, and then the polymerization reaction was terminated to obtain a gradient copolymer J3. Here, the monomer conversion of the polymerization reaction was 99.6%, the number average molecular weight Mn of the gradient copolymer J3 was 52,120, and the average side chain carbon number X was 11.8. The gradient copolymer J3 was used as a sample, and was subjected to GPC resolution to obtain 5 fractions in stages. The 5 fractions obtained in stages were analyzed separately, and the results are shown in Table 4.

TABLE 4

| | Item | | | | |
|---|---|---|---|---|---|
| | 1 | 2 | 3 | 4 | 5 |
| Component ratio, Y/% | 8.2 | 24.5 | 38.8 | 22.4 | 6.1 |
| Average side chain carbon number (X) | 11.70 | 11.91 | 12.36 | 13.68 | 13.90 |
| Number average molecular weight (Mn) | 20023 | 35289 | 50317 | 62527 | 74924 |

Example D

Five different linear alkyl methacrylate monomer mixtures A to E were prepared, and the composition of each mixture is shown in Table 5.

TABLE 5

| Mixture No. | A | B | C | D | E |
|---|---|---|---|---|---|
| C6 linear alkyl methacrylate/% | 50 | 0 | 0 | 0 | 0 |
| C8 linear alkyl methacrylate/% | 50 | 0 | 0 | 0 | 0 |
| C10 linear alkyl methacrylate/% | 0 | 73 | 31 | 0 | 0 |
| C12 linear alkyl methacrylate/% | 0 | 25 | 47 | 65 | 0 |
| C14 linear alkyl methacrylate/% | 0 | 2 | 22 | 35 | 0 |
| C16 linear alkyl methacrylate/% | 0 | 0 | 0 | 0 | 70 |
| C18 linear alkyl methacrylate/% | 0 | 0 | 0 | 0 | 30 |
| Average side chain carbon number (X) | 6.9 | 10.5 | 11.7 | 12.6 | 16.6 |
| Total amount/kg | 20 | 30 | 150 | 200 | 20 |
| Benzoyl peroxide/kg | 0.09 | 0.35 | 0.61 | 0.81 | 0.14 |
| Dodecyl mercaptan/kg | 0.075 | 0.30 | 0.45 | 0.65 | 0.11 |

Under nitrogen protection, 113 kg of dilution oil (purchased from Ssangyong Corporation, grade 100N, the same below) was added to a reactor equipped with mechanical stirring, and heated to 92-100° C. At the starting time of the dropwise addition, the mixture A was added dropwise into the reactor at a constant rate of 10 kg/hr, while the mixture B was added dropwise at a rate of 5 kg/hr. Then, the feed rate of the mixture B was gradually increased till 2 hours of addition, when the addition of the mixture A and the mixture B was terminated. Then, the mixture C and the mixture D were added dropwise to the reaction vessel. The ratio C/D of the dropwise addition amount (kg/hr) of the mixture C to the dropwise addition amount (kg/hr) of the mixture D was 3:1, and the sum of the two was 60 kg/hr. Then, the mixture C was gradually decreased, the mixture D was gradually increased, and the sum of the two was gradually increased till 5 hours of dropwise addition, when the ratio C/D reached 1:1, and the sum of the two reached 130 kg/hr. At this moment, the addition of the mixture C was terminated, and the mixture E was added dropwise to the reaction vessel. The ratio D/E of the dropwise addition amount (kg/hr) of the mixture D to the dropwise addition amount (kg/hr) of the mixture E was 10:1, and the sum of the two was 130 kg/hr. Then, the mixture D was gradually decreased, and the sum of the two was gradually decreased till 7 hours of dropwise addition, when the ratio D/E reached 1:1, and the sum of the two reached 13 kg/hr, and the addition was terminated. After that, the reaction vessel was kept at 100° C. for 1 hour, and then 0.3 kg of benzoyl peroxide and 113 kg of diluent oil were added, and the temperature was raised to 103° C. for 2 hours, and then the polymerization reaction was terminated to obtain a gradient copolymer J4. Here, the monomer conversion of the polymerization reaction was 99.2%, the number average molecular weight Mn of the gradient copolymer J4 was 39,120, and the average side chain carbon number X was 12.14. The gradient copolymer J4 was used as a sample, and was subjected to GPC resolution to obtain 8 fractions in stages. The 8 fractions obtained in stages were analyzed separately, and the results are shown in Table 6.

TABLE 6

| | Item | | | | | | | |
|---|---|---|---|---|---|---|---|---|
| | 1 | 2 | 3 | 4 | 5 | 6 | 7 | 8 |
| Component ratio, Y/% | 3.2 | 6.3 | 11.9 | 15.1 | 26.2 | 23.8 | 11.1 | 2.4 |
| Average side chain carbon number (X) | 8.00 | 9.64 | 12.05 | 12.00 | 12.23 | 13.16 | 13.50 | 14.13 |
| Number average molecular weight (Mn) | 18154 | 25124 | 30147 | 34987 | 37651 | 40154 | 49872 | 58326 |

The gradient copolymers J1 to J4 and the copolymer DJ1 were respectively added to the base oil in accordance with the amounts specified in Table 7. The amount of each copolymer, the kind of the base oil, and the results of the pour point depressing test are shown in Table 7.

TABLE 7

| | | The amount of copolymer added (wt %) | | |
|---|---|---|---|---|
| | | 0.1 | 0.3 | 0.5 |
| Copolymer | Base oil | Pour point/° C. | | |
| J1 | A | −33 | −33 | −36 |
| J2 | A | −30 | −33 | −36 |
| J3 | A | −33 | −36 | −36 |
| J4 | A | −33 | −33 | −36 |
| DJ1 | A | −21 | −30 | −33 |
| J1 | B | −39 | −45 | −45 |
| J2 | B | −36 | −45 | −45 |
| J3 | B | −39 | −42 | −45 |
| J4 | B | −36 | −42 | −45 |
| DJ1 | B | −30 | −39 | −45 |
| J1 | C | −30 | −33 | −33 |
| J2 | C | −27 | −30 | −33 |
| J3 | C | −30 | −30 | −33 |
| J4 | C | −30 | −33 | −36 |
| DJ1 | C | −21 | −24 | −27 |
| J5 | A | −30 | −33 | −36 |
| J6 | A | −27 | −33 | −33 |
| J7 | C | −27 | −33 | −36 |
| J8 | C | −27 | −30 | −33 |

By comparing the results obtained in the examples and the comparative examples, it can be seen that the gradient copolymer obtained in the present application exhibits an excellent pour point depressing effect for various lubricating base oils. Moreover, even if the addition amount is very small, the pour point of the lubricating base oil is still remarkably lowered, indicating that the gradient copolymer obtained in the present application also has a remarkable pour point depressing effect.

Example E

Under nitrogen protection, 113 kg of dilution oil (purchased from Ssangyong Corporation, grade 100N, the same below) was added to a reactor equipped with mechanical stirring, and heated to 83-91° C. A mixture A of 270 kg of a first monomer [a mixture of decyl methacrylate/dodecyl methacrylate/tetradecyl methacrylate/cetyl methacrylate/octadecyl methacrylate, where $C_{10}$=28%, $C_{12}$=32%, $C_{14}$=28%, $C_{16}$=8%, $C_{18}$=4%, X=12.3], 1.35 kg of benzoyl peroxide and 1.08 kg of dodecyl mercaptan was added dropwise to the reaction vessel at a constant rate of 50 kg/hr for 3 hours. Then, the dropping rate was linearly decreased, so that the feed rate was lowered to 30 kg/hr when the total feed time was 6 hours. At the same time, a mixture B of 150 kg of a second monomer [tetradecyl methacrylate/cetyl methacrylate/octadecyl methacrylate/eicosyl methacrylate, where $C_{14}$=38%, $C_{16}$=20%, $C_{18}$=25%, $C_{20}$=17%, X=16.2], 0.75 kg of benzoyl peroxide and 0.6 kg of dodecyl mercaptan was added dropwise to the reaction vessel at an initial rate of 10 kg/hr. Then, the addition amount of the mixture B was linearly increased, so that the feed rate was increased to 30 kg/hr when the total feed time was 3 hours, and then the feed rate was maintained for 3 hours. After the termination of the addition of both the mixtures A and B, the reaction vessel was kept at 95° C. for 1 hour, then 0.3 kg of benzoyl peroxide and 113 kg of diluent oil were added, and the temperature was raised to 103° C. for 2 hours, and then the reaction was terminated to obtain a pour point depressant J5 for lubricating oils. The monomer conversion in the pour point depressant J5 was 99.1%, the number average molecular weight of the gradient copolymer J5 was 40120, and the average side chain carbon number X was 13.5. The gradient copolymer J5 was used as a sample, and was subjected to GPC resolution to obtain 5 fractions in stages. The 5 factions obtained in stages were analyzed separately, and the results are shown in Table 8.

|  | Item | | | | |
| --- | --- | --- | --- | --- | --- |
|  | 1 | 2 | 3 | 4 | 5 |
| Component ratio, Y/% | 17.0 | 19.5 | 28.4 | 18.2 | 16.8 |
| Average side chain carbon number (X) | 12.90 | 13.21 | 13.54 | 13.83 | 14.01 |
| Number average molecular weight (Mn) | 25987 | 34561 | 41250 | 48647 | 57854 |

Example F

Under nitrogen protection, 113 kg of diluent oil was added to a reactor equipped with mechanical stirring, and heated to 83-91° C. A mixture A of 171 kg of a first monomer [a mixture of octyl methacrylate/decyl methacrylate/dodecyl methacrylate/tetradecyl methacrylate, where $C_8$=12%, $C_{10}$=15%, $C_{12}$=48%, $C_{14}$=25%, X=11.5], 0.9 kg of benzoyl peroxide and 0.7 kg of dodecyl mercaptan was added to the reaction vessel at an initial rate of kg/hr. Then, the feed rate was slowly and linearly decreased, so that the feed rate was decreased to 32 kg/hr when the total feed time was 3 hours. After that, the feed rate was rapidly and linearly decreased, so that the feed rate was decreased to 10 kg/hr when the total feed time was 6 hours. At the same time, a mixture B of 255 kg of a second monomer [a mixture of tetradecyl methacrylate/cetyl methacrylate/octadecyl methacrylate/eicosyl methacrylate, where $C_{14}$=38%, $C_{16}$=20%, $C_{18}$=25%, $C_{20}$=17%, X=16.2], 0.9 kg of benzoyl peroxide and 0.7 kg of dodecyl mercaptan was added dropwise to the reaction vessel at an initial rate of 20 kg/hr. The flow rate of the pump at the feed port B was set to increase linearly, so that the feed rate was increased to 50 kg/hr when the total feed time was 3 hours, and then the feed rate was maintained for 3 hours. After the termination of the addition of the mixtures A and B, the reaction vessel was kept at 95° C. for 1 hour, then 0.3 kg of benzoyl peroxide and 113 kg of diluent oil were added, and the temperature was raised to 103° C. for 2 hours, and then the reaction was terminated to obtain a pour point depressant J6 for lubricating oils. The monomer conversion of the pour point depressant J6 was 99.4%, the number average molecular weight was 41702, and the average side chain carbon number X was 14.0. The gradient copolymer J6 was used as a sample, and was subjected to GPC resolution to obtain 5 fractions in stages. The fractions obtained in stages were analyzed separately, and the results are shown in Table 9.

|  | Item | | | | |
| --- | --- | --- | --- | --- | --- |
|  | 1 | 2 | 3 | 4 | 5 |
| Component ratio, Y/% | 18.8 | 16.5 | 25.3 | 20.3 | 19.2 |
| Average side chain carbon number (X) | 12.81 | 13.30 | 14.00 | 14.86 | 15.10 |
| Number average molecular weight (Mn) | 23781 | 34217 | 41702 | 51514 | 59248 |

Example G

Under nitrogen protection, 100 kg of diluent oil was added to a reactor equipped with mechanical stirring, and heated to 83-91° C. A mixture A of 166 kg of a first monomer [a mixture of dodecyl methacrylate/tetradecyl methacrylate/cetyl methacrylate/octadecyl methacrylate, where $C_{12}$=50%, $C_{14}$=18 wt %, $C_{16}$=20 wt %, $C_{18}$=12 wt %, X=13.66], 0.4 kg of benzoyl peroxide and 0.5 kg of dodecyl mercaptan was added to the reaction vessel at a rate of 48 kg/hr. Then, the feed rate was slowly and linearly increased, so that the feed rate was increased to 56 kg/hr when the total feed time was 2 hours. After that, the feed rate was rapidly and linearly decreased, so that the feed rate was decreased to 6 kg/hr when the total feed time was 4 hours. At the same time, a mixture B of 303 kg of a second monomer [a mixture of decyl methacrylate/dodecyl methacrylate/tetradecyl methacrylate/cetyl methacrylate/octadecyl methacrylate/eicosyl methacrylate, where $C_{10}$=12 wt %, $C_{12}$=27 wt %, $C_{14}$=19 wt %, $C_{16}$=18 wt %, $C_{18}$=14 wt %, $C_{20}$=10 wt %, X=14.06], 0.75 kg of benzoyl peroxide and 0.9 kg of dodecyl mercaptan was added dropwise to the reaction vessel at an initial rate of 30 kg/hr. The flow rate of the pump at the feed port B was set to increase linearly, so that the feed rate was increased to 100 kg/hr when the total feed time was 2 hours, and then the feed rate was maintained for 2 hours. After the termination of the addition of both the mixtures A and B, the reaction vessel was kept at 95° C. for 2 hours, then 0.2 kg of benzoyl peroxide and 142 kg of diluent oil were added, and the temperature was raised to 103° C. for 2 hours, and the reaction was terminated to obtain a pour point depressant J7 for lubricating oils. The monomer conversion of the pour point depressant J7 was 98.9%, the number average molecular weight was 43196, and the average side chain carbon number X was 13.9. The gradient copolymer J7 was used as a sample, and was subjected to GPC resolution to obtain 5 fractions in stages. The 5 fractions obtained in stages were analyzed separately, and the results are shown in Table 10.

|  | Item | | | | |
| --- | --- | --- | --- | --- | --- |
|  | 1 | 2 | 3 | 4 | 5 |
| Component ratio, Y/% | 14.0 | 18.7 | 29.4 | 19.9 | 18.1 |
| Average side chain carbon number (X) | 13.82 | 13.86 | 13.92 | 14.01 | 14.03 |
| Number average molecular weight (Mn) | 32145 | 37451 | 42101 | 45324 | 50325 |

Example H

Under nitrogen protection, 100 kg of diluent oil was added to a reactor equipped with mechanical stirring, and heated to 83-91° C. A mixture A of 255 kg of a first monomer [a mixture of dodecyl methacrylate/tetradecyl methacrylate/cetyl methacrylate/octadecyl methacrylate, where $C_{12}$=50 wt %, $C_{14}$=18 wt %, $C_{16}$=20 wt %, $C_{18}$=12 wt %, $\Sigma R_1$=13.66], 1.2 kg of benzoyl peroxide and 1.0 kg of dodecyl mercaptan was added to the reaction vessel at a rate of 40 kg/hr. Then, the feed rate was slowly and linearly increased, so that the feed rate was increased to 50 kg/hr when the total feed time was 3 hours. After that, the feed rate was rapidly and linearly decreased, so that the feed rate was decreased to 30 kg/hr when the total feed time to 6 hours. At the same time, a mixture B of 150 kg of a second monomer [a mixture of tetradecyl methacrylate/cetyl methacrylate/octadecyl methacrylate/eicosyl methacrylate, where $C_{14}$=38 wt %, $C_{16}$=20 wt %, $C_{18}$=25 wt %, $C_{20}$=17 wt %, X=16.20], 0.70 kg of benzoyl peroxide and 0.60 kg of dodecyl mercaptan was added dropwise to the reaction vessel at an initial rate of 10 kg/hr. The flow rate of the pump at the feed port B was set to increase linearly, so that the feed rate was increased to 30 kg/hr when the total feed time was 3 hours, and then the feed rate was maintained for 3 hours. After the termination of the addition of both the mixtures A and B, the reactor vessel was kept at 95° C. for 2 hours, then 0.2 kg of benzoyl peroxide and 66 kg of diluent oil were added, and the temperature was raised to 103° C. for 2 hours, and the reaction was terminated to obtain a pour point depressant J8 for lubricating oils. The monomer conversion of the pour point depressant J8 was 99.7%, the number average molecular weight was 42637, and the average side chain carbon number X was 14.5. The gradient copolymer J8 was used as a sample, and was subjected to GPC resolution to obtain 5 fractions in stages. The 5 fractions obtained in stages were analyzed separately, and the results are shown in Table 10.

|  | Item | | | | |
| --- | --- | --- | --- | --- | --- |
|  | 1 | 2 | 3 | 4 | 5 |
| Component ratio, Y/% | 15.9 | 19.2 | 24.4 | 21.8 | 19.4 |
| Average side chain carbon number (X) | 14.21 | 14.33 | 14.52 | 14.61 | 14.80 |
| Number average molecular weight (Mn) | 35513 | 39425 | 43561 | 48215 | 55324 |

Example I

Under nitrogen protection, 113 kg of diluent oil was added to a reactor equipped with mechanical stirring, and heated to 95° C. 420 kg of monomer (a mixture of hexyl methacrylate/octyl methacrylate/decyl methacrylate/dodecyl acrylate/tetradecyl methacrylate, X=11.2), 2.0 kg of benzoyl peroxide and 1.68 kg of dodecyl mercaptan were mixed in a feed tank, and then the resulted monomer was added to the reaction vessel at a rate of 90 kg/hr for 5 hours. After the completion of the addition, 0.3 kg of benzoyl peroxide and 113 kg of diluent oil were added, and the temperature was raised to 110° C. for 2 hours, and then the reaction was terminated to obtain a polymer M1. The monomer conversion of the polymerization reaction was 98.1%, and the number average molecular weight Mn of the polymer M1 was 35,870.

Polymers M2 to M20 were produced in the same manner, and the results are shown in Table 11.

TABLE 11

| Polymer | Average side chain carbon number (X) | Number average molecular weight (Mn) | Monomer conversion/% |
|---|---|---|---|
| M1 | 11.2 | 35870 | 99.4 |
| M2 | 11.4 | 36490 | 98.6 |
| M3 | 11.6 | 36995 | 97.5 |
| M4 | 11.8 | 37542 | 98.1 |
| M5 | 12.1 | 38012 | 99.4 |
| M6 | 12.3 | 37954 | 98.6 |
| M7 | 12.5 | 39143 | 98.7 |
| M8 | 12.7 | 39997 | 98.4 |
| M9 | 13.0 | 42716 | 99.0 |
| M10 | 13.1 | 44546 | 98.9 |
| M11 | 13.3 | 44998 | 99.1 |
| M12 | 13.5 | 46154 | 99.1 |
| M13 | 13.7 | 47587 | 99.4 |
| M14 | 14.0 | 48957 | 97.6 |
| M15 | 14.2 | 50478 | 98.8 |
| M16 | 14.5 | 51257 | 97.7 |
| M17 | 14.7 | 53054 | 99.4 |
| M18 | 15.0 | 55214 | 99.0 |
| M19 | 15.2 | 56851 | 96.9 |
| M20 | 15.5 | 58245 | 97.3 |

Those polymers were mixed in accordance with the ratios specified in Table 9, and the gradient copolymers of Examples C-1 to C-7 and the comparative copolymers of Comparative Examples C-1 to C-2 were produced separately, and each copolymer was tested for the pour point depressing effect on the lubricating base oil, and the results are shown in Table 9.

TABLE 9

| Polymer | Ex. C-1 | Ex. C-2 | Ex. C-3 | Ex. C-4 | Ex. C-5 | Ex. C-6 | Ex. C-7 | Comp. Ex. C-1 | Comp. Ex. C-2 |
|---|---|---|---|---|---|---|---|---|---|
| M1 | 5 | 0 | 0 | 3 | 2 | 5 | 0 | 0 | 0 |
| M2 | 0 | 10 | 0 | 0 | 0 | 0 | 20 | 50 | 0 |
| M3 | 7 | 0 | 5 | 0 | 0 | 5 | 0 | 0 | 0 |
| M4 | 0 | 20 | 0 | 20 | 3 | 0 | 0 | 0 | 0 |
| M5 | 11 | 0 | 15 | 0 | 0 | 10 | 0 | 0 | 0 |
| M6 | 0 | 0 | 0 | 0 | 0 | 0 | 0 | 20 | 0 |
| M7 | 0 | 0 | 18 | 0 | 7 | 20 | 0 | 0 | 0 |
| M8 | 15 | 0 | 0 | 0 | 0 | 0 | 0 | 0 | 0 |
| M9 | 0 | 40 | 29 | 0 | 0 | 0 | 30 | 0 | 0 |
| M10 | 33 | 0 | 0 | 0 | 75 | 30 | 0 | 10 | 100 |
| M11 | 0 | 20 | 0 | 50 | 0 | 0 | 30 | 0 | 0 |
| M12 | 15 | 0 | 18 | 0 | 0 | 0 | 0 | 0 | 0 |
| M13 | 0 | 0 | 0 | 0 | 7 | 20 | 0 | 0 | |
| M14 | 8 | 0 | 0 | 0 | 0 | 0 | 20 | 0 | 0 |
| M15 | 0 | 10 | 8 | 20 | 0 | 0 | 0 | 0 | 0 |
| M16 | 6 | 0 | 0 | 0 | 3 | 10 | 0 | 0 | 0 |
| M17 | 0 | 0 | 5 | 0 | 0 | 0 | 0 | 0 | 0 |
| M18 | 0 | 0 | 0 | 7 | 2 | 0 | 0 | 0 | 0 |
| M19 | 0 | 0 | 2 | 0 | 0 | 0 | 0 | 0 | 0 |
| M20 | 0 | 0 | 0 | 0 | 1 | 0 | 0 | 0 | 0 |
| Base oil A | −33 | −36 | −30 | −33 | −30 | −33 | −27 | −21 | −27 |
| Base oil B | −42 | −45 | −45 | −42 | −45 | −45 | −42 | −36 | −39 |
| Base oil C | −33 | −33 | −30 | −33 | −30 | −33 | −27 | −21 | −24 |

It can be seen from the results of Table 9 that the gradient copolymers provided by the present application show excellent pour point depressing effects for the base oils obtained by different processing methods. From the comparison between Examples C-1 to C-6 and Example C-7, it can be seen that when the ratio of each polymer component in the gradient copolymer is controlled within a preferred range, the corresponding gradient copolymer shows a better pour point depressing effect. From the comparison between the results obtained in Example C-2 and those obtained in Comparative Examples C-1 to C-2, it can be seen that when the polymer component of the gradient copolymer satisfies the requirements of the present application, the corresponding gradient copolymer shows a better pour point depressing effect.

In the specification of the present application, numerous specific technical details are disclosed. However, it can be appreciated that certain embodiments of the present application may be practiced without those specific details. Moreover, in some embodiments, methods, structures, and techniques known in the art are not described in detail, but this will not hinder the understanding of any aspect of the present application.

Similarly, as can be appreciated, in the description of the exemplary embodiments of the present disclosure, the various features are sometimes grouped together into a single embodiment, a FIGURE, or its description for brevity or helping the understanding of one or more disclosed aspects. However, the disclosure should not be interpreted as reflecting the intention that the claimed invention requires more features than those explicitly recited in each claim. Rather, as reflected in the claims, the claimed technical solutions may comprise less features as compared to a single embodiment described herein. Therefore, the claims following the detailed description of the invention are hereby explicitly incorporated into the detailed description, and each claim can be considered as an individual embodiment of the present invention, per se.

It should also be noted that, in this context, relational terms such as first, second, and the like are used merely to distinguish one entity or operation from another entity or operation, without necessarily requiring or implying any actual relationship or order between such entities or operations. Furthermore, the term "comprise" or "include" or any other variants thereof is intended to encompass a non-exclusive inclusion, such that a process, method, article, or device comprising a plurality of elements includes not only those elements but also other elements not mentioned, and elements that are inherent to such a process, method, item, or device. In the absence of further limitation, an element defined by the phrase "comprising one . . . " does not exclude an additional presence of the same element in the process, method, item, or device.

The above examples are only used to illustrate the technical solutions of the embodiments of the present disclosure, and are not intended to be limiting. Although the present application has been described in detail with reference to the foregoing embodiments, those skilled in the art will understand that the technical solutions described in the embodiments can be modified, or some technical features described therein can be replaced by equivalents thereof. Such modification or replacement will not depart the corresponding technical solution from the spirit and scope of the technical solutions of various embodiments of the present application.

The invention claimed is:

1. A gradient copolymer comprising or consisting of a plurality of polymer components, wherein each of the plurality polymer components independently is an addition polymer of a monomer of formula (I), and/or a mixture of monomers of formula (I),

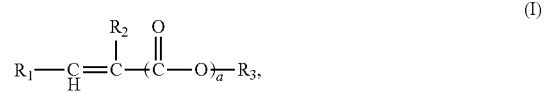

or
each of the plurality of polymer components independently comprises or consists essentially of one or more structural units of formula (I-1),

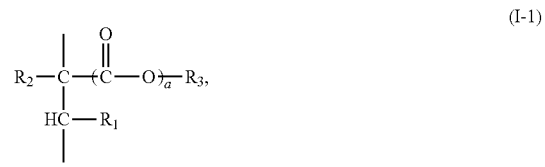

wherein a total number of the plurality of polymer components is n, and n is an integer within the closed interval [5, ∞], and in formula (I) or formula (I-1), the group $R_1$ is H or

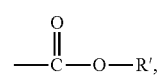

the group $R_2$ is H or a $C_{1-4}$ linear or branched alkyl,
a is 0 or 1,
the group R' is H or a group $R_3$,
the group $R_3$ is a $C_1$-$C_{30}$ linear or branched alkyl group, and
wherein an average number of carbon atoms in side chain of the i-th polymer component, as determined by nuclear magnetic resonance, is $X_i$, wherein i is an integer from 1 to n, and $X_1 < X_2 < \ldots < X_{n-1} < X_n$,
wherein a weight percentage of the i-th polymer component relative to a total weight of the plurality of polymer components is $Y_i$, and $Y_1 < Y_2 < \ldots < Y_j > \ldots > Y_{n-1} > Y_n$,
wherein j is an integer within the closed interval [(n+1)/4, 3(n+1)/4], and
$Y_1 + Y_2 + \ldots + Y_i + \ldots + Y_{n-1} + Y_n = 100\%$,
wherein $Y_i$ and $X_i$ satisfy the following relationship, $$Y_i = f(X_i) = \frac{1}{\sqrt{2\pi}\,\sigma} e^{-\frac{(X_i - \mu)^2}{2\sigma^2}}, \quad (IV)$$

wherein μ is a value within the open interval (12.5, 14.2), and σ is a value within the open interval (0.5, 2).

2. The gradient copolymer according to claim 1, wherein the gradient copolymer has an average number of carbon atoms in side chain, as determined by nuclear magnetic resonance, within a range from 5 to 20, or the number average molecular weight Mn of the plurality of polymer components or the gradient copolymer is each independently from 10,000 to 1,000,000, or the molecular weight distribution Mw/Mn of the plurality of polymer components or the gradient copolymer is each independently from 1.8 to 3.5.

3. The gradient copolymer according to claim 1, wherein the monomer of formula (I) is one or more selected from the group consisting of $C_6$ linear alkyl (meth)acrylates, $C_8$ linear alkyl (meth)acrylates, $C_{10}$ linear alkyl (meth)acrylates, $C_{12}$ linear alkyl (meth)acrylates, $C_{14}$ linear alkyl (meth)acrylates, $C_{16}$ linear alkyl (meth)acrylates, $C_{18}$ linear alkyl (meth)acrylates, and $C_{20}$ linear alkyl (meth)acrylates.

4. The gradient copolymer according to claim 1, wherein a proportion (by mole) of the one or more structural units of formula (I-1), in which the group $R_3$ is a $C_{10}$-$C_{18}$ linear or branched alkyl group, relative to the total amount of the structural units constituting each of the plurality of polymer components, is from 40% to 95%.

5. The gradient copolymer according to claim 1, wherein said $X_1$ is a value within the closed interval [6.5, 12.5], or said $X_n$ is a value within the closed interval [13.8, 19.5].

6. The gradient copolymer according to claim 1, wherein said $Y_j$ is within a range from 20% to 75%, or said $Y_1$ or $Y_n$ is within a range from 0.01% to 20%.

7. A method for producing the gradient copolymer according to claim 1, comprising:

adding at least two monomers to a polymerization system, and conducting an addition copolymerization of the at least two monomers, wherein the at least two monomers each independently is a compound of formula (I),

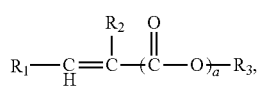

and in formula (I), the group $R_1$ is H or

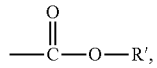

the group $R_2$ is H or a $C_{1-4}$ linear or branched alkyl,
a is 0 or 1,
the group R' is H or a group $R_3$,
the group $R_3$ is a $C_1$-$C_{30}$ linear or branched alkyl group, and
wherein the starting time of adding the at least two monomers to the polymerization system is $t_0$, and the termination time is $t_m$, the addition time of the at least two monomers is t and $t=t_m-t_0$, and wherein the addition time is divided into m segments, m is an integer within the closed interval [5, ∞], wherein, during the addition of the at least two monomers, a ratio between the at least two monomers added to the polymerization system at any moment of time $t_x$, the symbol x representing an integer from 0 to m, varies such that the average number of carbon atoms in side chain $X_x$ of a resulting mixture composed of the at least two monomers as determined by nuclear magnetic resonance satisfies the following relationship, $X_0 < X_1 < \ldots < X_{m-1} < X_m$.

8. The production method according to claim 7, wherein, at the termination time $t_m$ of the addition, a sum of the cumulative amounts of the at least two monomers added to the polymerization system through the addition time t is G, and a sum of the amounts of the at least two monomers added to the polymerization system at any moment of time $t_x$ during the addition of monomers is $G_x$, and $G_0/G < G_1/G < \ldots < G_j/G > \ldots > G_{m-1}/G > G_m/G$, wherein j is an integer within the closed interval [m/4, 3m/4].

9. The production method according to claim 7, wherein the at least two monomers are two or more selected from the group consisting of a $C_6$ linear alkyl (meth)acrylate, a $C_8$ linear alkyl (meth)acrylate, a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, and a $C_{18}$ linear alkyl (meth)acrylate; or two or more selected from the group consisting of a $C_8$ linear alkyl (meth)acrylate, a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, a $C_{18}$ linear alkyl (meth)acrylate, and a $C_{20}$ linear alkyl (meth)acrylate.

10. The production method according to claim 7, wherein the proportion (by mole) of the compound of formula (I), in which the group $R_3$ is a $C_{10}$-$C_{18}$ linear or branched alkyl group, relative to the total amount of the monomers is within a range from 40% to 95%.

11. The production method according to claim 7, wherein said $X_0$ is a value within the closed interval [6.5, 12.5], or said $X_m$ is a value within the closed interval [13.8, 19.5].

12. The production method according to claim 8, wherein the ratio $G_j/G$ is within a range from 20% to 75%, or the ratio $G_0/G$ or the ratio $G_m/G$ is within a range from 0.01% to 20%.

13. A method for producing the gradient copolymer according to claim 1, comprising the step of mixing a plurality of polymer components, wherein each of the plurality of polymer components is an addition polymer of a monomer of formula (I),

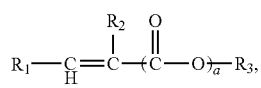

and/or a mixture of monomers of formula (I), or each of the plurality of polymer components independently comprises or consists essentially of one or more structural units of formula (I-1),

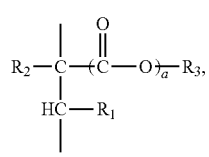

wherein the number of the plurality of polymer components is p and p is an integer from 5 to 10000, and
in formula (I) or formula (I-1),
the group $R_1$ is H or

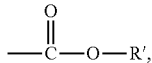

the group $R_2$ is H or a $C_{1-4}$ linear or branched alkyl,
a is 0 or 1,
the group R' is H or a group $R_3$,
the group $R_3$ is a $C_1$-$C_{30}$ linear or branched alkyl group,
where the average number of carbon atoms in side chain of the i-th polymer component, as determined by nuclear magnetic resonance, is $X_i$, wherein i is an integer from 1 to p, and $X_1<X_2<\ldots<X_{p-1}<X_p$.

14. The production method according to claim 13, where the weight percentage of the i-th polymer component relative to the total weight of the plurality of polymer components is $Y_i$, wherein i is an integer from 1 to p, and $Y_1<Y_2<\ldots<Y_j>\ldots>Y_{p-1}>Y_p$,
wherein j is an integer within the closed interval [(p+1)/4, 3(p+1)/4], and $Y_1+Y_2+\ldots+Y_j+\ldots+Y_{p-1}+Y_p=100\%$.

15. The production method according to claim 13, wherein the proportion (by mole) of the one or more structural units of formula (I-1), in which the group $R_3$ is a $C_{10}$-$C_{18}$ linear or branched alkyl group, relative to the total amount of the structural units constituting each of the plurality of polymer components is within a range from 40% to 95%.

16. The production method according to claim 13, wherein said $X_1$ is a value within the closed interval [6.5, 12.5], or said $X_p$ is a value within the closed interval [13.8, 19.5].

17. The production method according to claim 14, wherein said $Y_j$ is within a range from 20% to 75%.

18. A lubricating oil composition comprising the gradient copolymer according to claim 1, and a lubricating base oil, wherein, on the basis of the gradient copolymer, the content by weight of the gradient copolymer in the lubricating base oil is within a range from 0.01 wt % to 2 wt %.

19. A method of lowering a pour point of a lubricating oil, comprising the step of adding the gradient copolymer of claim 1 into the lubricating oil.

20. The method according to claim 7, wherein the at least two monomers are at least two selected from the group consisting of a $C_{10}$ linear alkyl (meth)acrylate, a $C_{12}$ linear alkyl (meth)acrylate, a $C_{14}$ linear alkyl (meth)acrylate, a $C_{16}$ linear alkyl (meth)acrylate, a $C_{18}$ linear alkyl (meth)acrylate and a $C_{20}$ linear alkyl (meth)acrylate; or
are at least two selected from the group consisting of a $C_8$ linear alkyl (meth)acrylate, a $C_{14}$ linear alkyl (meth)acrylate, a $C_{16}$ linear alkyl (meth)acrylate, a $C_{18}$ linear alkyl (meth)acrylate, and a $C_{20}$ linear alkyl (meth)acrylate.

* * * * *